Figure 16:
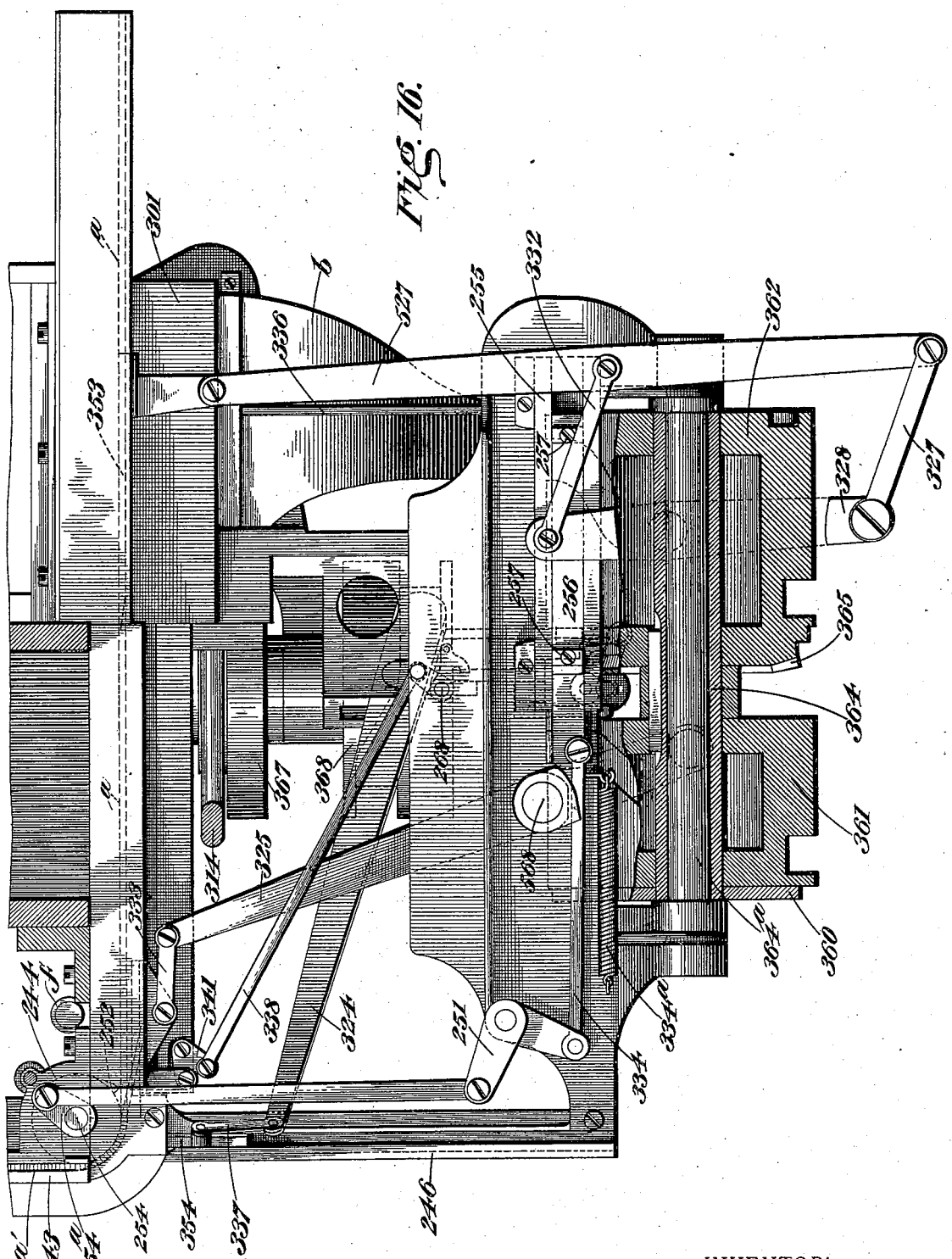

No. 646,359. Patented Mar. 27, 1900.
P. F. COX.
SPACE AND LEAD DISCARDER AND DISTRIBUTER LOADER.
(Application filed Aug. 30, 1899.)
(No Model.) 13 Sheets—Sheet 1.
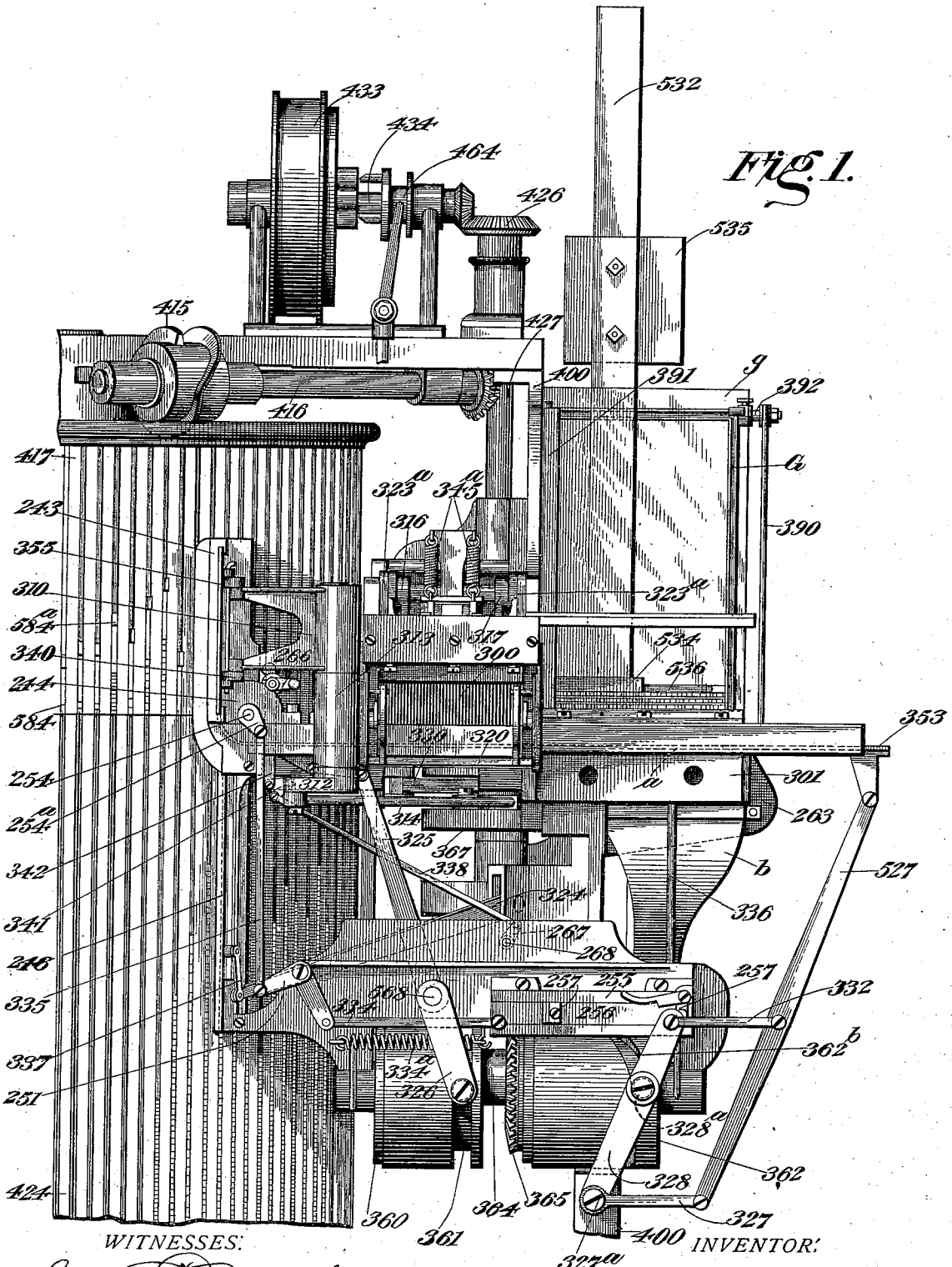

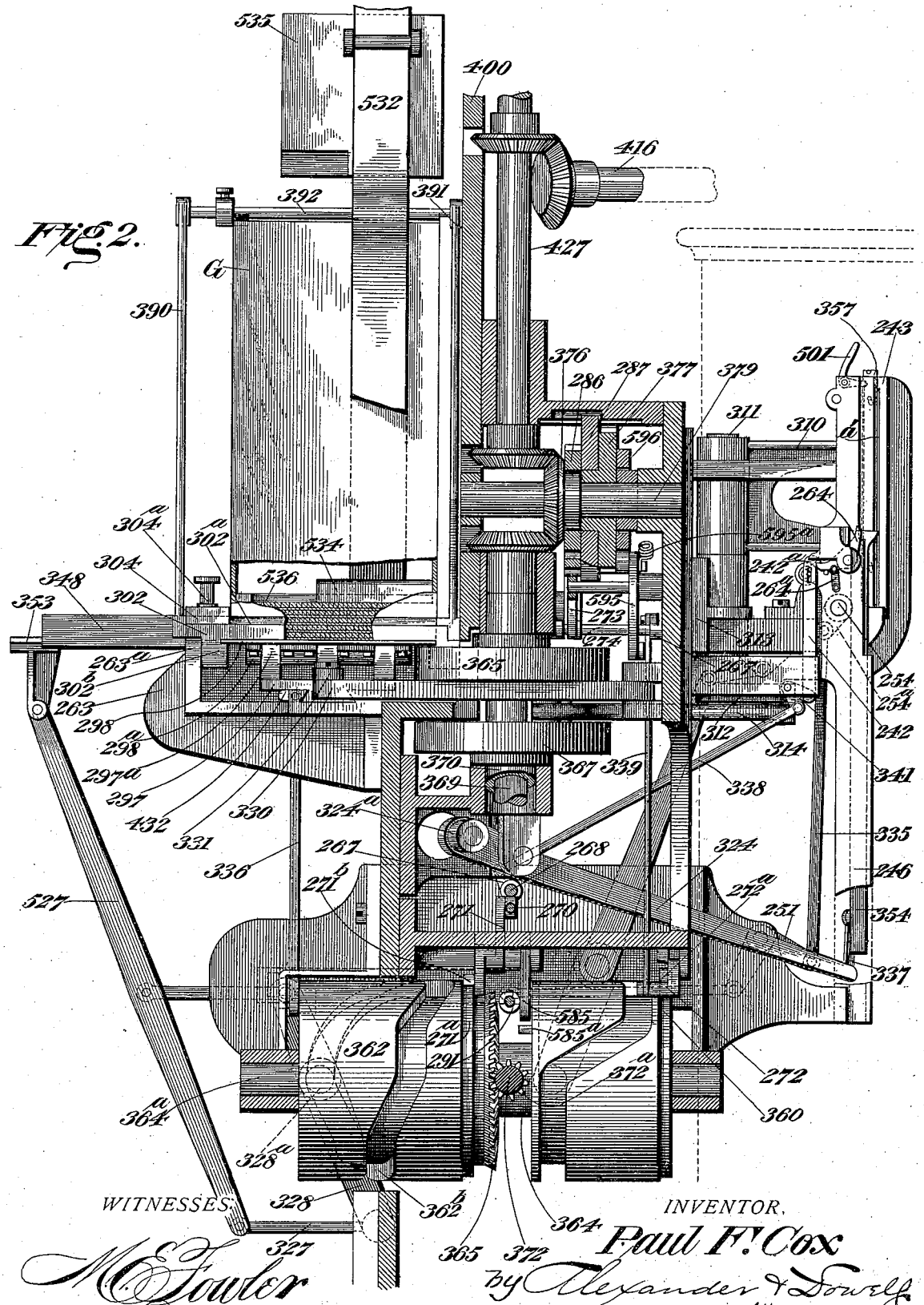

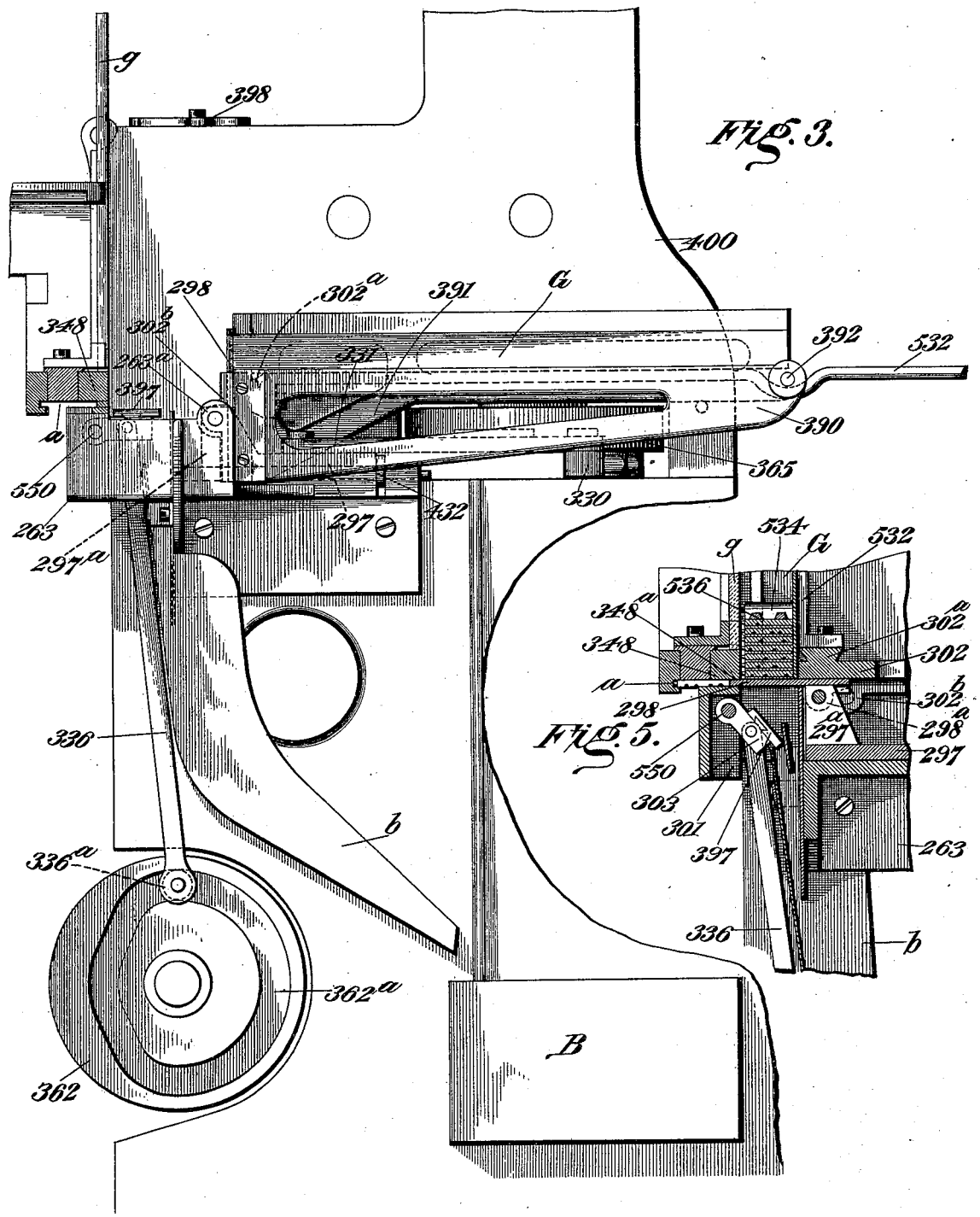

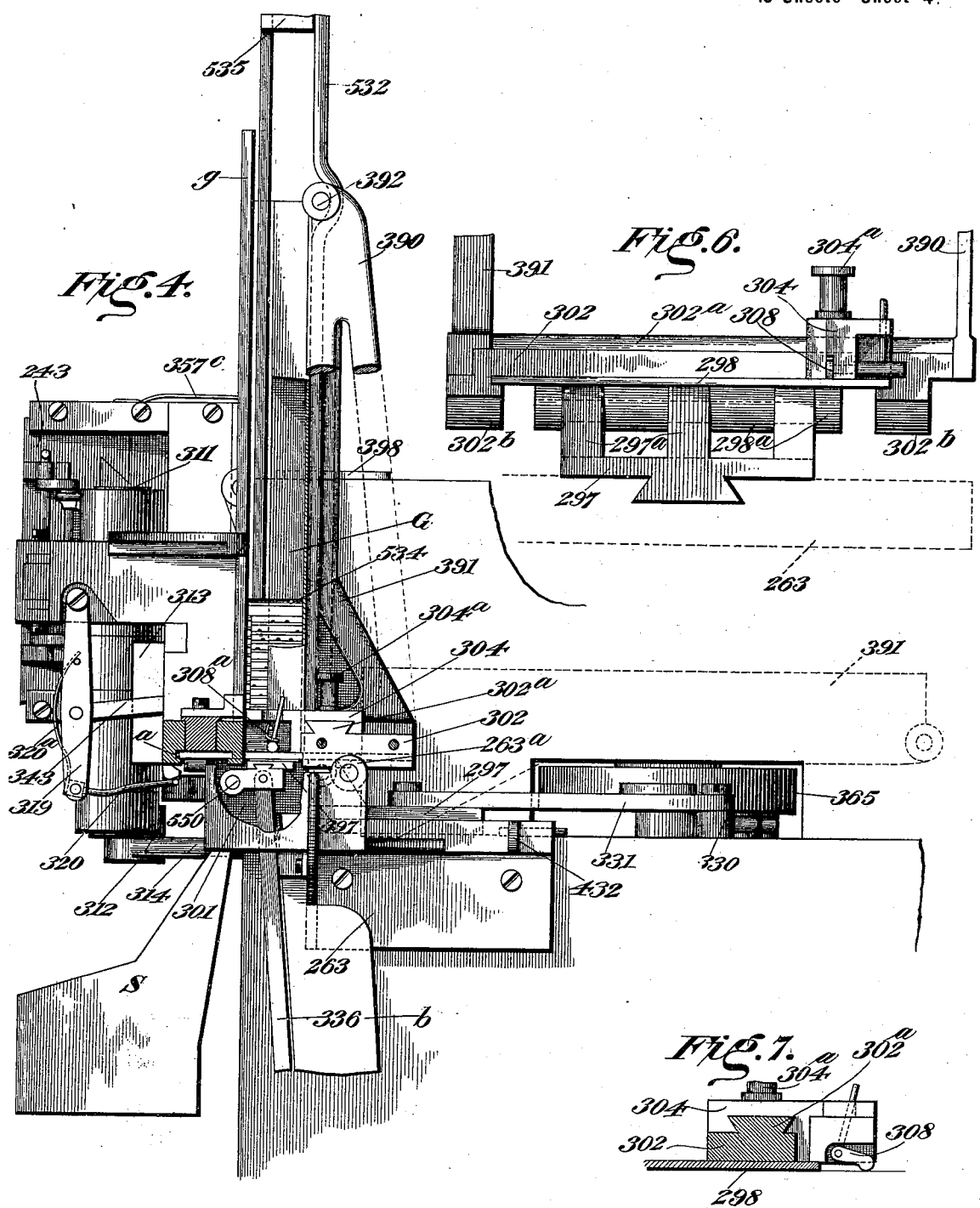

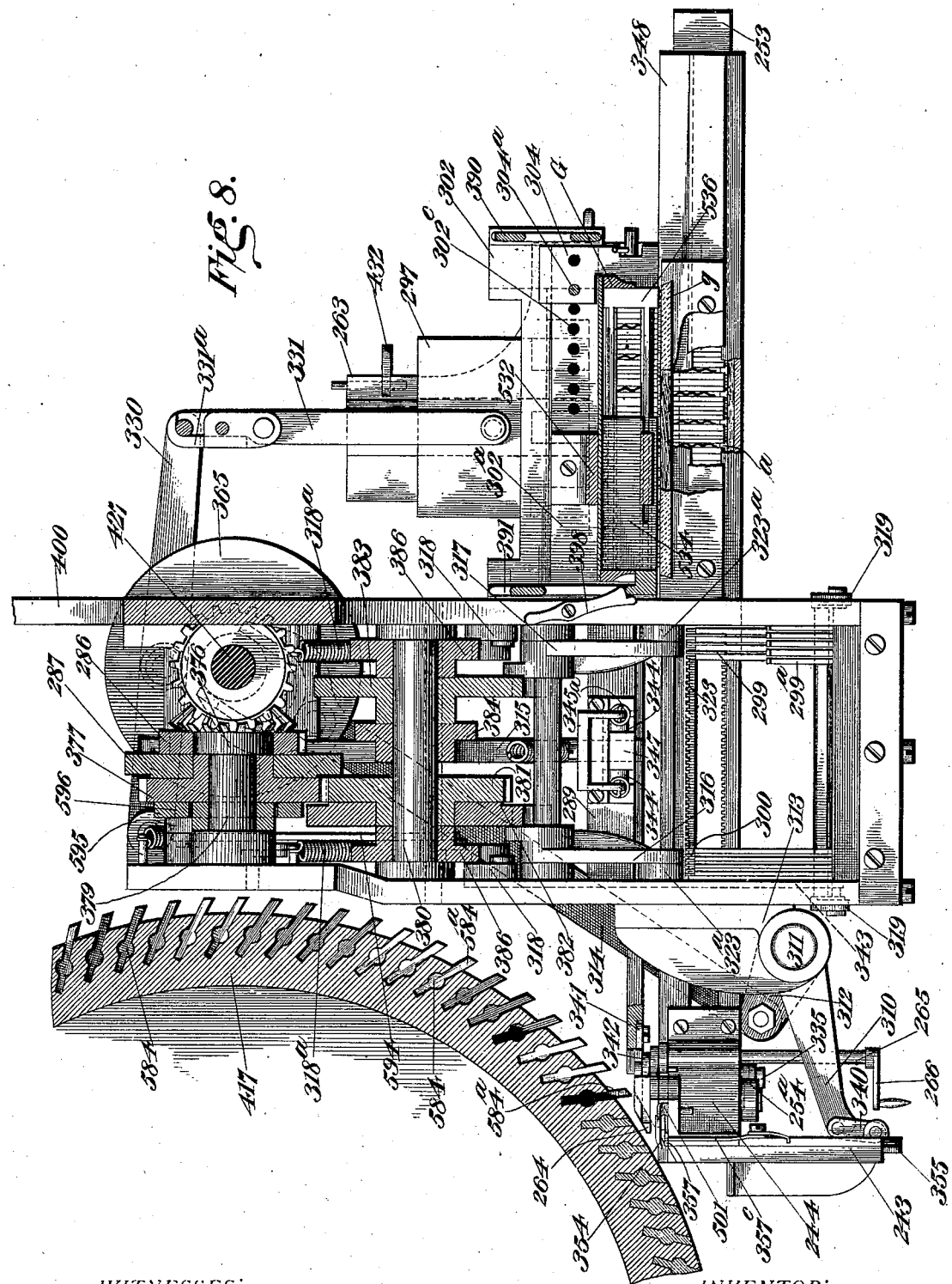

No. 646,359. Patented Mar. 27, 1900.
P. F. COX.
SPACE AND LEAD DISCARDER AND DISTRIBUTER LOADER.
(Application filed Aug. 30, 1899.)
(No Model.) 13 Sheets—Sheet 6.
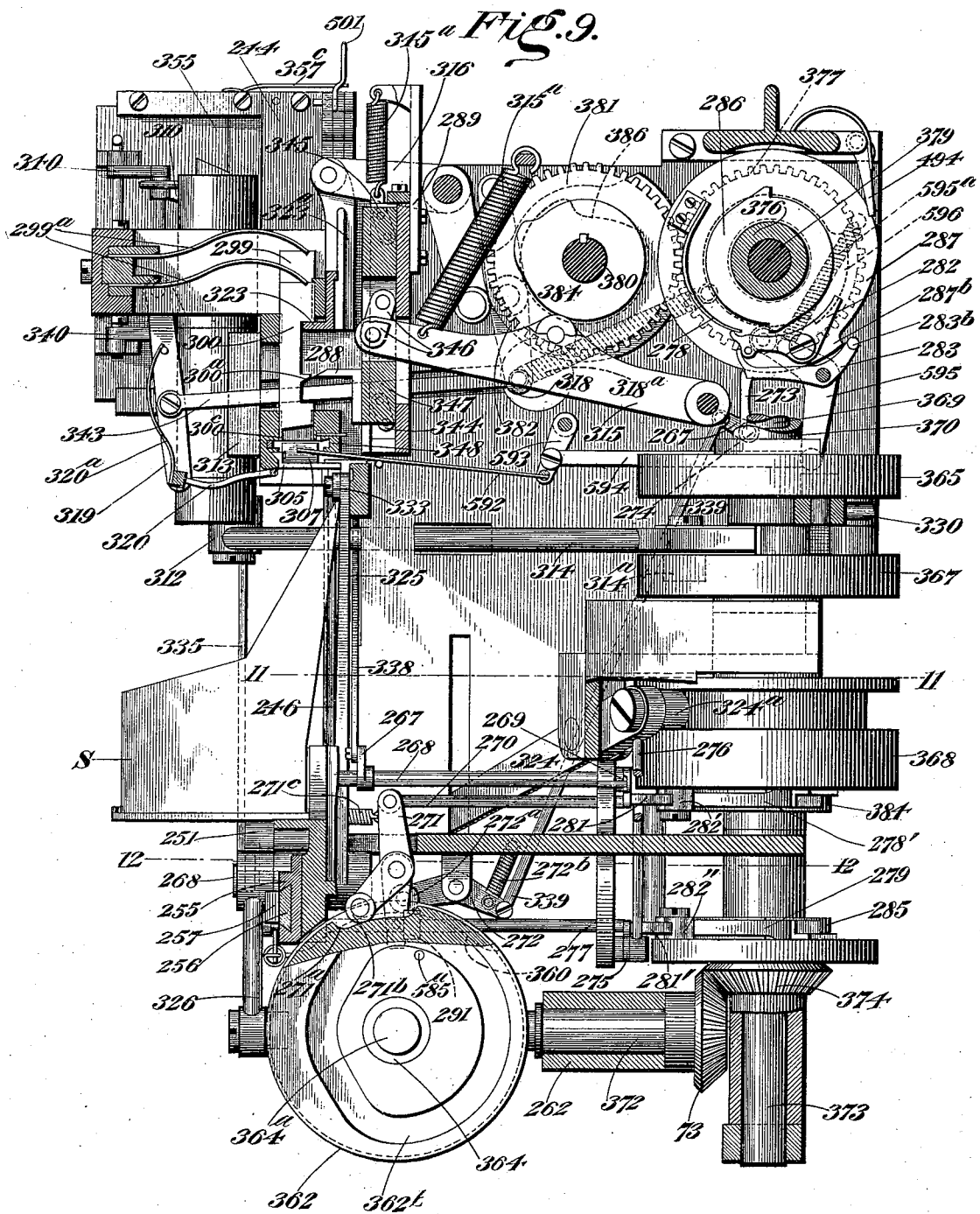
WITNESSES:
M. C. Fowler
James R. Mansfield
INVENTOR:
Paul F. Cox
By Alexander & Dowell
Attorneys

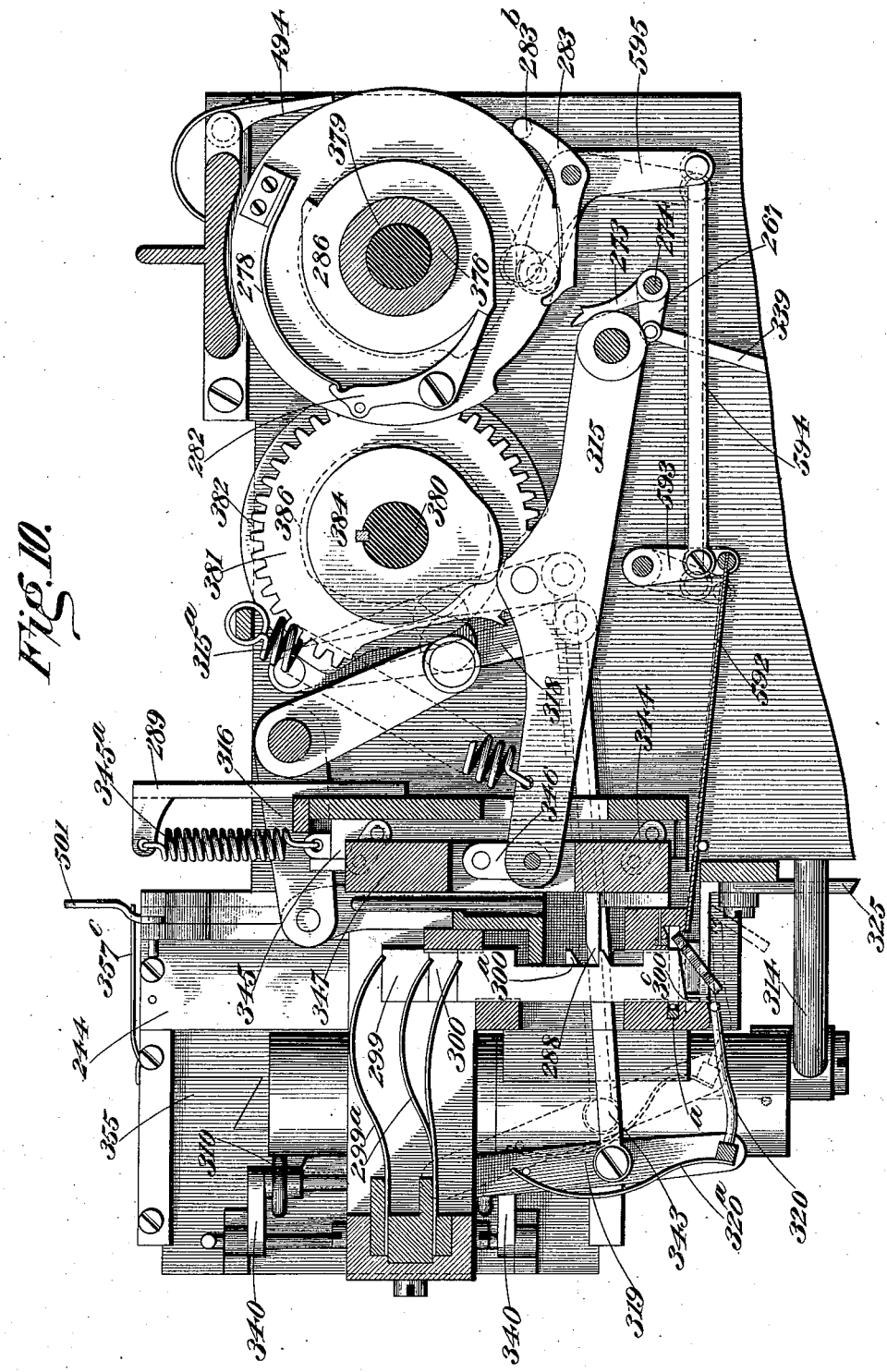

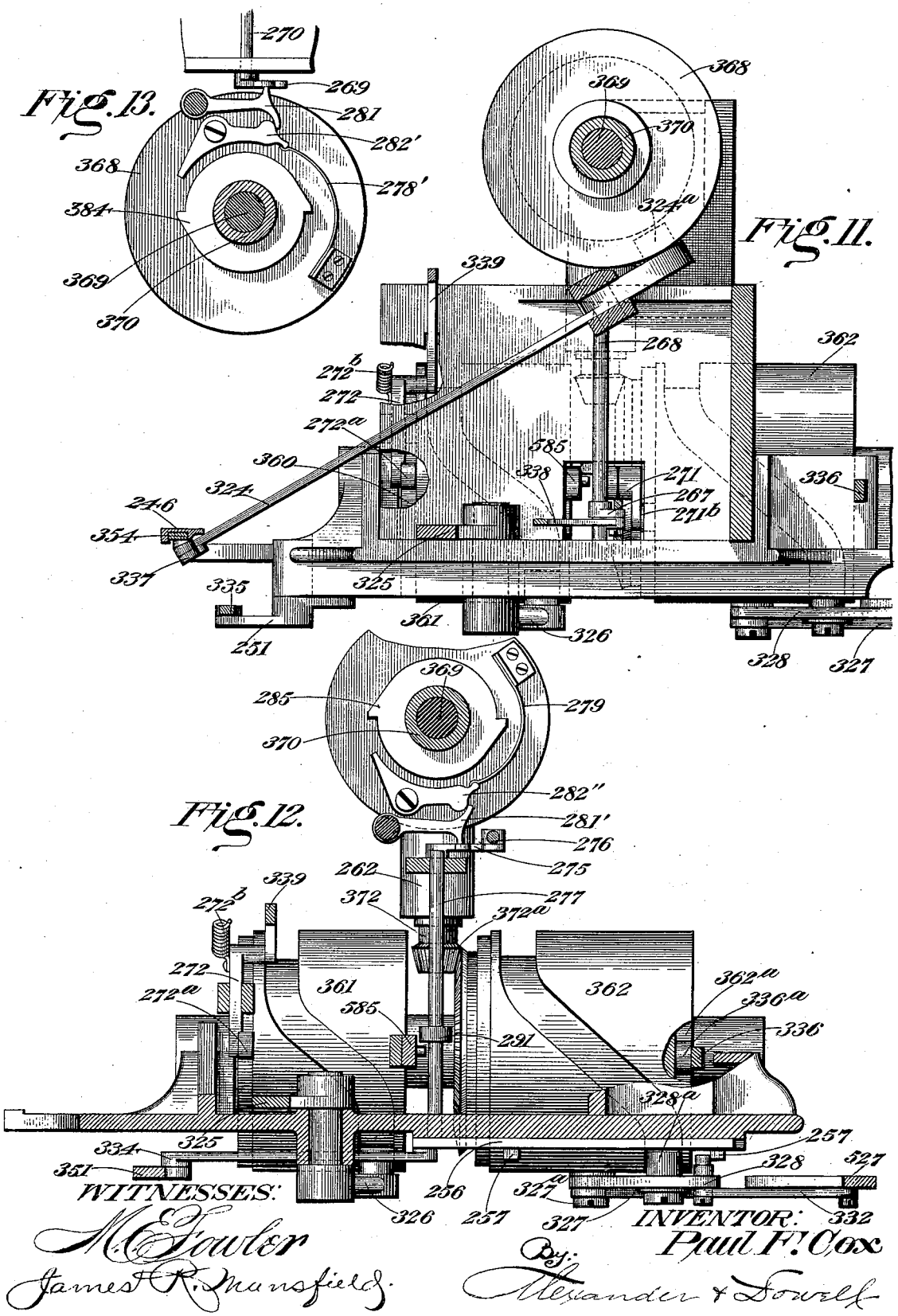

No. 646,359. Patented Mar. 27, 1900.
P. F. COX.
SPACE AND LEAD DISCARDER AND DISTRIBUTER LOADER.
(Application filed Aug. 30, 1899.)
(No Model.) 13 Sheets—Sheet 9.
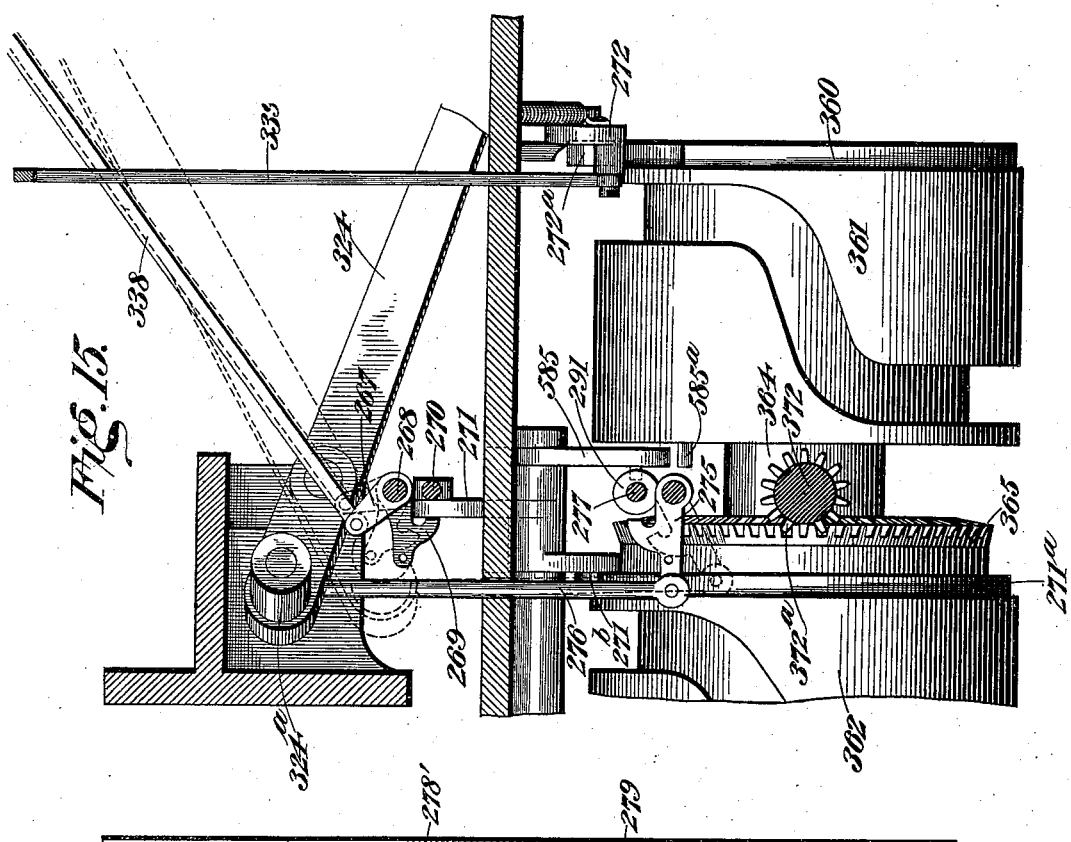
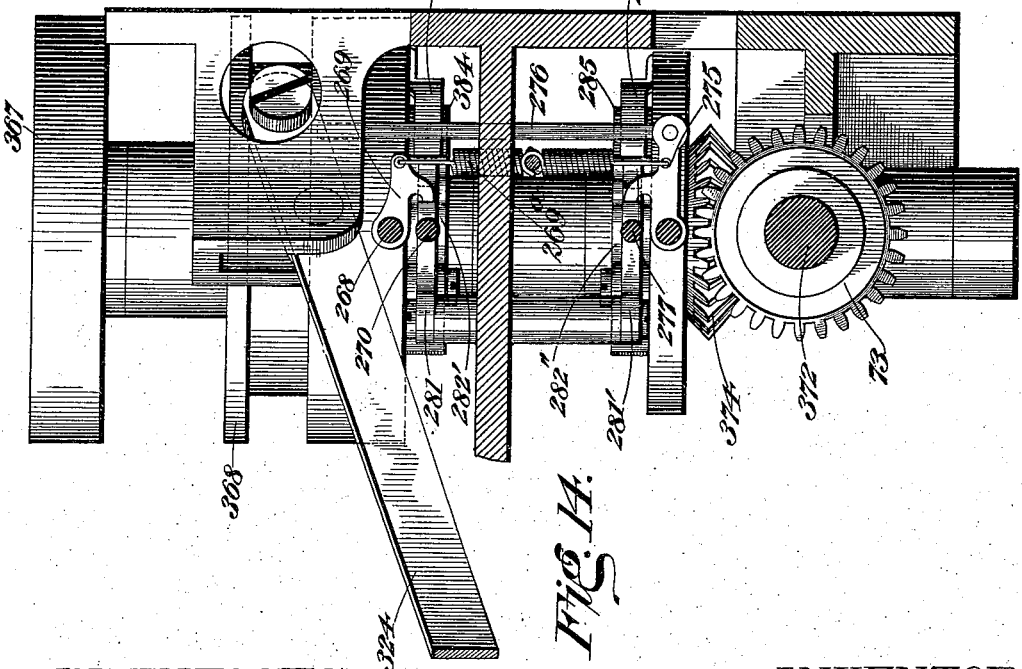
WITNESSES: INVENTOR:
Paul F. Cox No. 646,359. Patented Mar. 27, 1900.
P. F. COX.
SPACE AND LEAD DISCARDER AND DISTRIBUTER LOADER.
(Application filed Aug. 30, 1899.)
(No Model.) 13 Sheets—Sheet 10.

WITNESSES: INVENTOR:
Paul F. Cox
By:
Alexander & Dowell
Attorneys

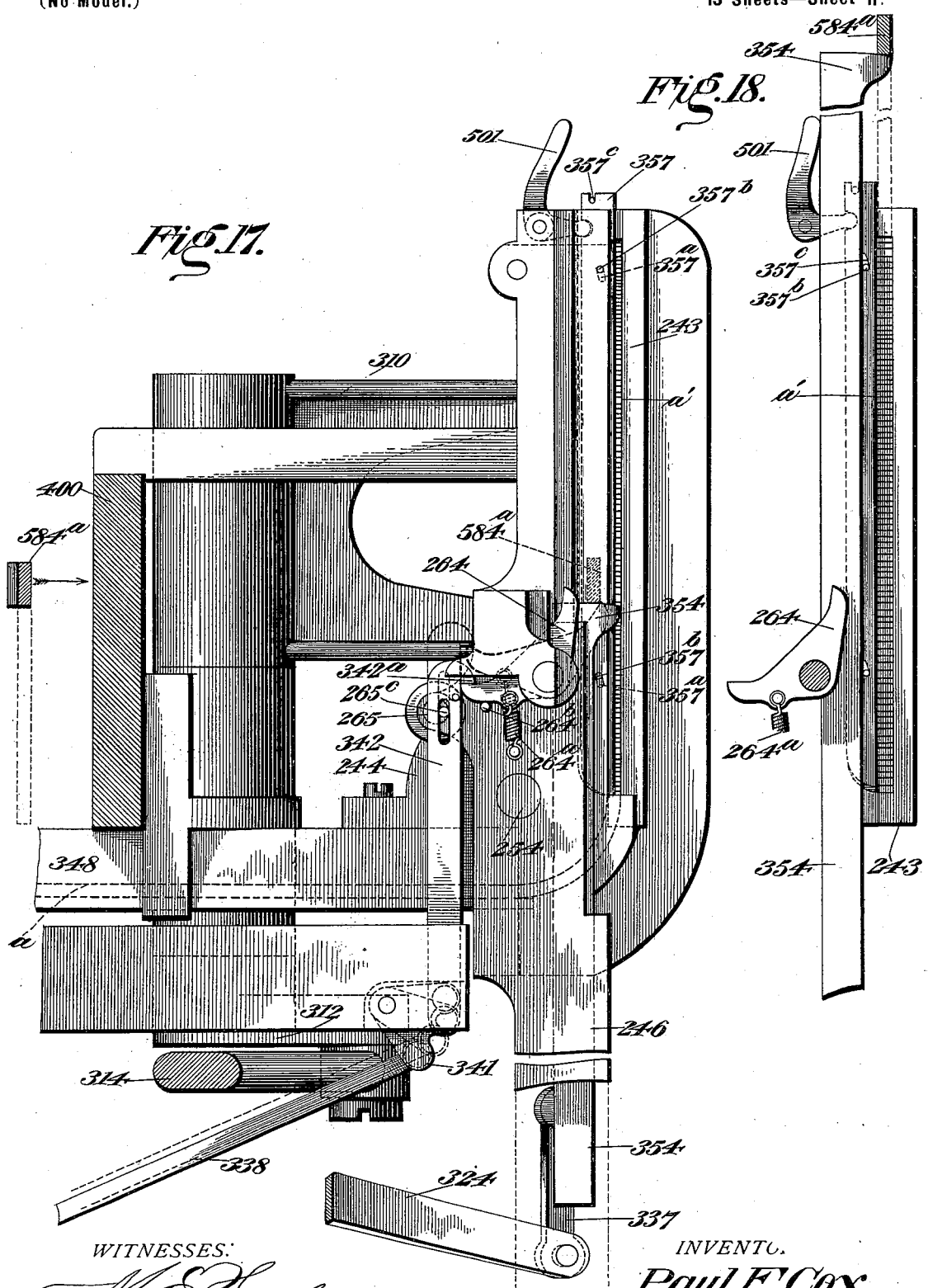

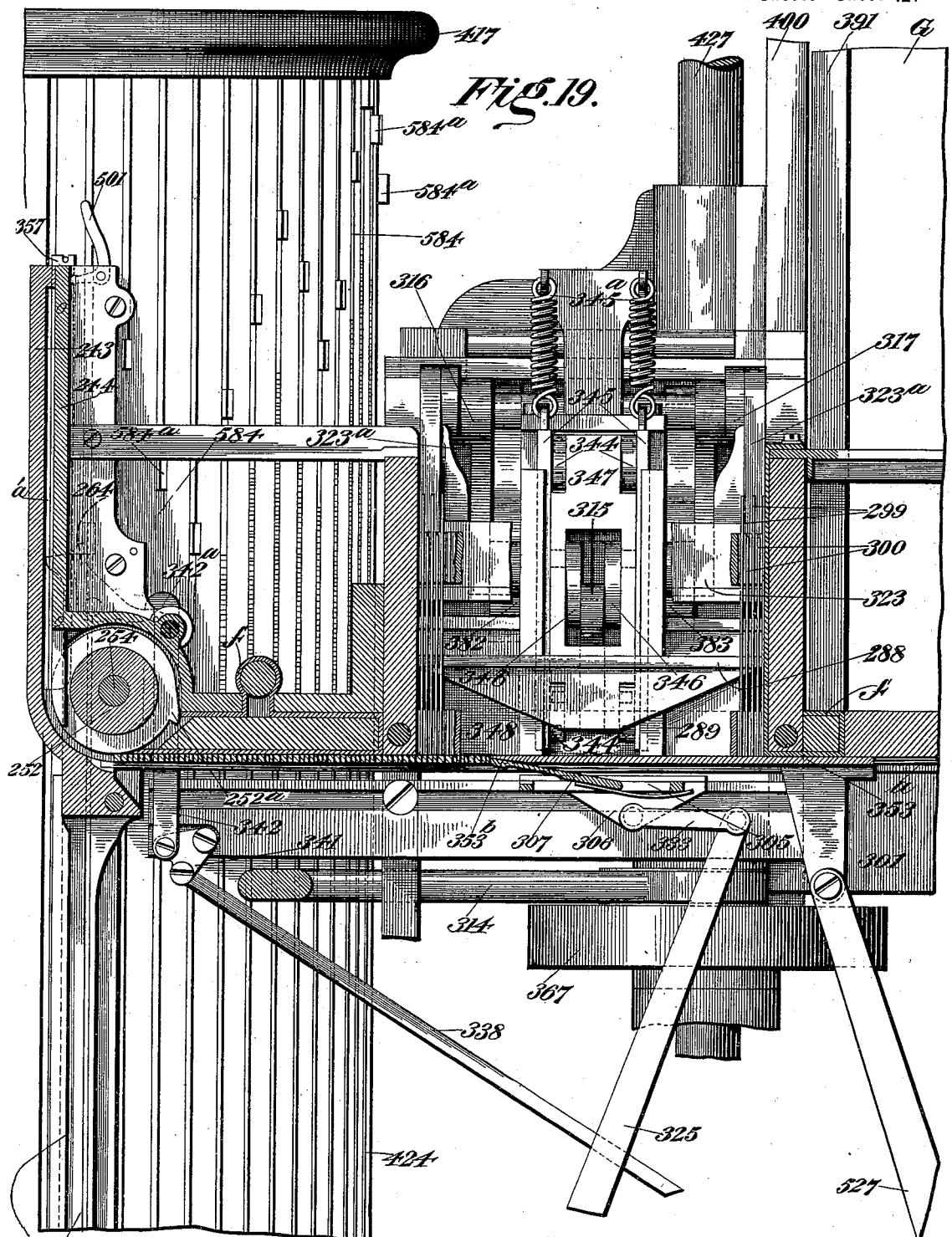

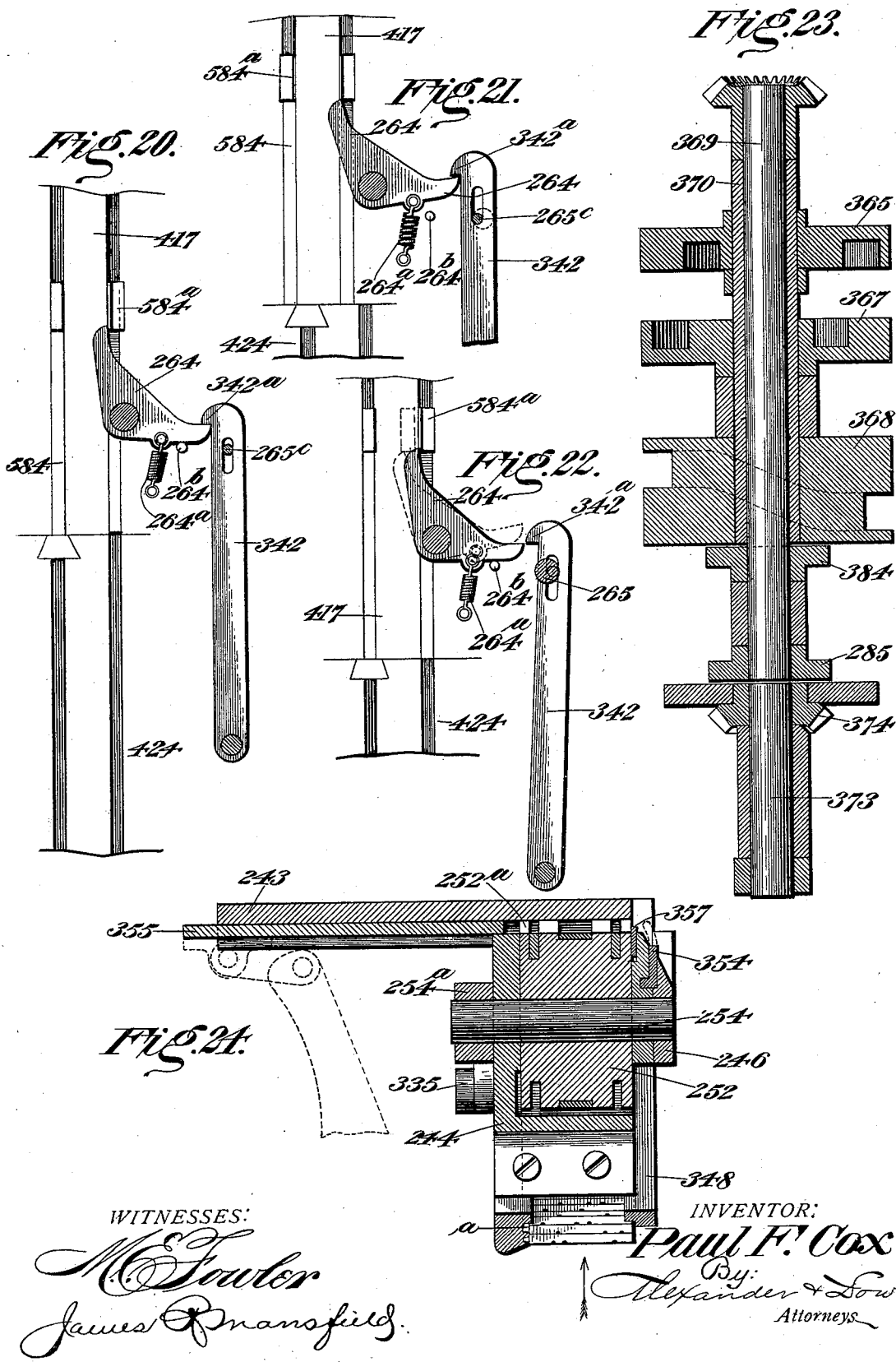

UNITED STATES PATENT OFFICE.

PAUL FLEMMING COX, OF MANCHESTER, CONNECTICUT, ASSIGNOR TO THE UNITYPE COMPANY, OF SAME PLACE.

SPACE AND LEAD DISCARDER AND DISTRIBUTER-LOADER.

SPECIFICATION forming part of Letters Patent No. 646,359, dated March 27, 1900.

Application filed August 30, 1899. Serial No. 728,965. (No model.)

*To all whom it may concern:*

Be it known that I, PAUL FLEMMING COX, of Manchester, in the county of Hartford and State of Connecticut, have invented certain new and useful Improvements in Space and Lead Discarders and Distributer-Loaders; and I hereby declare that the following is a full, clear, and exact description thereof, reference being had to the accompanying drawings, which form part of this specification.

This invention relates to type-distributing apparatus, and is especially designed for use in connection with machines in which the type are distributed by moving a series of channels containing undistributed type over a fixed series of test-plates which may be attached to the type-reservoir, being particularly adapted to machines of the style known generally as the "Thorne" type-setting machine, in which the undistributed type are placed in a grooved cylinder which is rotated over another cylinder containing the distributed type; and the present invention, briefly, is designed (a) to separate the lines from the galley of dead-matter, (b) to discard leads from the lines, (c) to remove all the spaces, quads, &c., from the separated lines, and (d) to automatically introduce the lines from which the spaces and leads have been removed into the empty channels in the type-distributer without stopping the distributing operation of the machine. These several operations are to be performed automatically, and the operation of the mechanisms is or may be controlled entirely by the followers or weights placed in the distributer-channels or by other suitable means, so that whenever an empty channel in the distributer comes opposite the loading mechanism it will automatically receive a supply of undistributed type, and at the same time the mechanism will be put in operation to make ready another line of undistributed type to be charged into the next empty channel of the distributer.

The invention therefore embodies, first, novel means for separating the lines of type from the dead-matter and removing the leads therefrom; second, novel mechanism whereby the spaces may be removed from the lines of type; third, novel means for effecting the change of movement of the line of type from the horizontal to the vertical, and, fourth, novel means for automatically loading lines of type into the channels of a moving distributer or type-holder.

The invention can be also readily adapted for use in loading the channels of the setting-reservoir; but in the drawings the invention is shown as applied to a machine in which the type are distributed directly from the distributing-cylinder into the channels of the reservoir or setting-cylinder, and I shall describe the invention as applied and adapted to such a distributing-machine.

In the accompanying drawings, Figure 1 is a front elevation of the complete apparatus as applied to a Thorne type-setting machine. Fig. 2 is a rear elevation of the same, slightly enlarged, partly in section and partly broken away. Fig 3 is a detail view, enlarged, of the galley and mechanism for separating the lines from dead matter. Fig. 4 is a similar view, partly in section, of the mechanism shown in Fig. 3. Fig. 5 is a sectional view of the lead-discarding devices. Fig. 6 is a rear elevation of the lower part of the galley-rest and its connections. Fig. 7 is a detail. Fig. 8 is a top sectional elevation of the complete apparatus, partly broken away. Fig. 9 is a part side elevation and vertical section of the complete apparatus, particularly showing the space-discarding mechanism, the outer side plate being removed. Fig. 10 is an enlarged sectional view of the space-discarding mechanism. Fig. 11 is a transverse section of the apparatus on line 11 11, Fig. 9, looking downward. Fig. 12 is a similar view on line 12 12, Fig. 9, looking downward. Fig. 13 is a detail view of one of the clutch mechanisms. Figs. 14 and 15 are detail sectional views illustrating the clutch-tripping mechanisms. Fig. 16 is an enlarged front elevation, partly broken away, of the lower portion of the apparatus, showing the line-advancing mechanism. Fig. 17 is an enlarged rear elevation of the loading mechanism. Fig. 18 is a detail of the part shown in Fig. 17. Fig. 19 is an enlarged sectional elevation looking rearward, showing the space-discarding and loading mechanisms. Figs. 20, 21, and 22 are detail views of the trip mechanisms. Fig. 23 is a detail view of the shafts 369 and 373 and the cams thereon. Fig. 24 is a detail horizontal sectional view of the loading mechanism.

424 designates the distributed-type reservoir of the complete machine, which is a fixed channeled cylinder of the ordinary Thorne type, over which rotates a distributing-cylinder 417, provided with a series of type-holding channels adapted to register with the channels in the cylinder 424. This cylinder 417 is rotated by a step-by-step movement upon cylinder 424 by any suitable means. As shown, it is rotated by means of a worm 415 on a shaft 416, driven by bevel-gearing from a vertical shaft 427, which latter shaft is the driving-shaft of the space-discarding and distributer-loading mechanism which forms the subject of the present invention. Shaft 427 is driven by a bevel-gear 426 on its upper end from a bevel-gear on a short horizontal shaft 434, which is driven from any suitable source of power by means of fast and idler pulleys, or, as shown, by means of a pulley 433, which can be locked to the shaft by means of a clutch 464, which can be thrown into or out of operation by a conveniently-arranged hand-lever, as shown.

The above-described devices do not constitute part of the present invention, which resides in the mechanisms by which type-lines can be separated from a galley of undistributed type, the leads and spaces discarded therefrom, and each line subsequently loaded into the distributing-cylinder 417.

The present invention as a whole I term a "space and lead discarding and distributer-loading mechanism," and most of the operative parts thereof are supported upon or from a vertical frame 400, which is attached to the base of the machine and rises beside the cylinder 417, as shown.

For convenience in description of the apparatus I will trace the course of a line of type from the time it is separated from the dead matter in the galley until it is finally loaded into the channel of the distributing-cylinder and in so doing will describe the various operations upon such line of type and the various mechanisms by which these operations are performed in its travel from the dead-matter galley to the distributing-cylinder.

*The line-separator and lead-discarder.*—
The galley G, containing the dead matter, is placed in a holder or "galley-rest bracket," which is preferably constructed of opposite side castings 390 and 391, attached to opposite ends of a casting 302, which has a dovetailed rib 302ª on its upper side and is provided with depending lugs 302ᵇ, by which it is hinged between a lug 263ª on a bracket 263 and the adjoining side plate of frame 400, so that the holder can be turned from a vertical to a horizontal position. The outer ends of side pieces 390 391 are connected by a rod 392, and on the rib 302ª is slidably mounted an adjustable clamp-block 304, by which galleys G of different widths can be secured in the holder, this block 304 being secured in place by a pin 304ª, which transfixes the block and is adapted to engage any one of a series of holes 302ᶜ in rib 302ª, as shown. When the galley-holder is turned to vertical position, it is held by a catch 398 on side of frame 400, (see Fig. 8,) and in this position the type are retained in the galley by a glass or other suitable plate g, as shown. The casting 302 is also provided with guides for a transversely-movable slide or plunger 298, which when the holder is in a horizontal position, as shown in Fig. 1, will close the inner end of the holder, and against which the end of the galley and the type therein may rest, and when the holder is in vertical position, Figs. 1, 2, 4, and 5, this plunger 298 alternately supports the type in the galley and is the means for ejecting the lines successively therefrom. Plunger 298 is pivotally connected at 298ª to ears 297ª on a slide 297, which is mounted in bracket 263, and slide 297 is connected by a pitman 331 to the free end of a vibrating lever 330, whose inner end is pivoted on the frame and which is provided intermediate its ends with a roller that engages a race-cam groove in the cam 365, fast upon a sleeve 370, surrounding a vertical shaft 369, which shaft is driven by bevel-gears 376 from a horizontal shaft 379, which in turn is driven by bevel-gears from the shaft 427, as shown. (See Fig. 2.) Pitman 331 is detachably attached to the lever 330 by catch 331ª for the following reasons:

It will be observed by reference to Fig. 4 that when the galley-holder 390 is in vertical position the fulcrum or pivotal connection between the plunger 298 and slide 297 is in advance of the hinge-pivots of the galley-holder and it is necessary to get the pivots of the plunger and holder in line before the holder can be lowered. To do this, pitman 331 is disconnected from lever 330, and slide 297 is then pulled back until its end is arrested by a stop 432, (which is simply a little gravital lug pivoted to the part 263 and upheld by the fingers, so as to limit the rearward movement of the slide 297 at this time.) When the slide is thus pulled back, as indicated in Fig. 3, the pivots of the plunger and holder are in line, and the holder can then be turned down into a horizontal position, as shown in Fig. 3. When thus turned down, the plunger 298 will form the end wall of the holder, and the galley G, loaded with undistributed and leaded type, can be placed in the holder and pushed in against the plunger 298. The holder is then turned to a vertical position and the slide 297 pushed inward until the pitman 331 can be again connected to lever 330, when the parts will be in operative position. This brings the undistributed matter to a vertical position above and supported upon the plunger 298, which lies directly over a false bottom 397, which is attached to a plate 303, hinged on a rod 550, supported on a plate 301 just below and in front of the lower end of the galley-holder. The bottom 397 is upheld normally by the rod 336, which is provided at its lower end with a friction-roller 336ª, which engages a race cam-groove 362ª in the end of a drunken cam 362, hereinafter referred to.

The bottom 397 is detachably connected to plate 303, so that it may be interchanged with others of greater or less thickness, according to the leading of the matter to be distributed. If the matter is not leaded, bottom 397 should be of such thickness as to fit closely against the under side of slide 298 when the bottom is closed, as shown in Fig. 4. If the matter is single-leaded, a bottom 397 should be substituted, which will just leave room for one lead to lie upon the bottom, between it and the plunger 298, and if double-leaded a still thinner bottom 397 should be used.

To the galley-holder is attached a guide-bar 532 for a weight 535, to which is attached a follower 534, which when the holder is in vertical position will rest upon the top of the type in the galley and force the same down therein. This follower 534 is provided with a laterally-extensible slide 536, by which the length of the follower can be varied to fit the width of the galley in the holder.

The functions of the above-described devices are to separate lines of type from the dead matter in the galley and to discard the leads therefrom, and their operation is as follows: When the plunger 298 is retracted, the undistributed matter in the galley will drop down upon the bottom 397, which is then in its horizontal or closed position. The plunger is then actuated, so as to move forward over this bottom and eject the lowermost line of type laterally from the galley through a slot 348ª (in the bar 348 at the base of the galley-support) into a horizontally-disposed type-channel $a$. If the matter were leaded, a thin bottom 397 would be used, so that the lead would remain upon the bottom 397 while the superimposed line of type would be pushed out into the channel $a$. When the plunger 298 has entirely ejected a line of type from the holder and is in or about the position shown in Fig. 5, the bottom 397 is dropped, allowing the lead thereon to slide off and down through a chute $b$ into a lead-box B. The bottom is then restored to normal position, whereupon the plunger 298 is retracted, and this operation will be repeated each time the plunger is is actuated. Thus the operations of separating the lines and discarding the leads are entirely automatic.

The block 304 is made adjustable to enable different-sized galleys to be secured in the same holder, and the machine shown can accommodate any length of line from thirteen to twenty-eight ems. The slide 298 is as wide as the longest line to be operated upon, and when operating upon lines of such length both sides of the slot under the galley, in which the slide 298 works, will be closed; but when operating upon shorter lines such slot is narrowed and one end thereof will be left practically open, and perchance an end type might fall over or twist into this open end of the slot, so as to cause trouble. To prevent any such contingency, I preferably pivotally attach to the inner side of the adjustable block 304 a tumbler 308, which occupies a recess in the block and is normally upheld by the slide 298; but when the latter is retracted this tumbler will drop down upon the bottom 397 and prevent any type slipping out of the open end of the slot under the galley in which 298 moves. The tumbler 308 is pressed down by a spring 308ª, as shown.

*The space-discarding mechanism.*—After the line has been separated from the galley and the lead discarded, as described, the line is subjected to the action of the space-discarding mechanism, as follows: The line of type ejected from the galley by plunger 298 is moved laterally forward into a horizontally-disposed channel $a$ and in front of a plunger 353, which is operated at the proper time so as to move the line forward in channel $a$ by means of the lever 527, which is pivotally connected at its lower end to one end of a link 327, the other end of which is pivoted to the main frame, as shown, by a bolt 327ª, to which is also pivoted the lower end of a lever 328, the upper end of which is connected to lever 527 by a second link 332. Lever 328 is provided with a roller 328ª, which engages the peripheral cam-groove 362ª in a cam 362, which is mounted upon a sleeve 364, that is driven from a shaft 373 by means of a bevel-gear 365ª on the cam end meshing with a smaller bevel 372ª on a shaft 372, journaled in a fixed bracket 262, and shaft 372 is driven by a bevel-gear 73 meshing with another bevel 374 on the shaft 373, which is in line with, but independent of, shaft 369, but is intermittently driven from the latter by a clutch mechanism, as hereinafter described. I would also state at this point that the sleeve 370 is also intermittently driven from shaft 369 by clutch mechanism hereinafter described.

The cam-groove 362ª in cam 362 is so shaped as to give a number of intermittent impulses to the follower 353 in moving it from right to left, but will return the same quickly from left to right. The object of this intermittent movement of the plunger 352 is to move the line of type in channel $a$ forward and subject the same several times to the action of the space-discarding mechanism, which is constructed and operates upon the line as follows:

Above the channel $a$, between the cylinder 417 and the galley-holder, is arranged a series of vertically-disposed space discarders or ejectors 299 and 300, the latter being slightly shorter than the former. These ejectors are constructed substantially like and have substantially the same mode of operation as those described in my Patent No. 550,553, of November 26, 1895. They are provided with feeler-tips 300ᶜ on their lower ends, by which they are enabled to locate the spaces, and with projections 300ª, which are adapted to be engaged by an actuating-bar 288 on a vertically-movable slide 347, which is suspended by links 344 from vertically-movable bars 345, which are normally upheld by springs $345^a$, which are guided in their vertical movements by a casting 289, attached to frame 400. Slide 347 is connected by links 346 to the forward end of a lever 315, which is provided with a friction-roller bearing against a peripheral cam 384, keyed to a shaft 380, lever 315 being upheld by a stout coiled spring $315^a$, as shown. The shaft 380 is driven by a gear 381 meshing with a pinion 377, loosely journaled on shaft 379, from which it is driven intermittently at the proper time by a clutch mechanism hereinafter described. This shaft 379 is driven continuously, as above described, by gearing from shaft 427.

Each of the ejector-fingers 300 and 299 is pressed downward by individual springs $299^a$, as shown, and all the ejectors are notched to fit over the edge of a vertically-movable controller-plate 323, which has arms $323^a$, by which it is connected to rocking bell-crank levers 316 317, which are pivoted on the frame and are provided with friction-rollers which respectively bear against peripheral cams 382 and 383, keyed on shaft 380, as shown. The plate 323 is held normally in raised position, and therefore holds the ejectors 299 and 300 up and out of the way of the line of type in channel $a$; but when the line of type comes to rest momentarily under the ejectors the controller 323 is lowered and such of the ejectors whose feelers find a space in the line of type will drop still farther, so that their projections $300^a$ will be in position to be struck by the positively-actuated bar 288, which at that time is swung downward by the action of lever 315 and cam 384. By reason of the toggle connection between the bar 288 and the lever 315, formed by the oppositely-swinging links 344 and 346, bar 288 is given a quick outward and downward movement in actuating the ejectors and a quick rearward and upward movement after it disengages them, so that it catches the projections $300^a$ of those ejectors which have found a space, forcibly depressing the same, thereby knocking a space out of the line, and then swings backward and upward out of the way. As soon as the plate 288 is out of the way the controller 323 is raised and draws all of the ejectors up out of the way of the line, which is then again advanced by plunger 353, stopped, and the operation of the ejectors again repeated.

It will be observed that the channel $a$ is horizontal and that the type-line therein is presented broadside and flatwise to the action of the ejectors; further, that the channel beneath the ejectors is practically an open slot, with merely a narrow groove at each side, just sufficient to support a full-length type over such slot, but will allow a space, which is shorter than the type, to be easily pushed out of the line and out of the channel, the discarded spaces falling by gravity into a space-box S, supported on the frame just beneath the ejectors, as shown.

Practically I propose to submit each line of type several times to the action of the ejectors, and therefore cam 362 is formed to give the plunger 353 three or four intermittent movements from right to left in advancing the line under the ejectors, and the discarder mechanism is so actuated and timed that each time the line stops the ejector mechanism is operated, thus insuring the complete elimination or discarding of the spaces from the line. The means for thus regulating the operation of the discarders or ejectors will be hereinafter explained.

It sometimes happens that a space pushed out by the ejectors does not wholly separate from the line, but hangs therefrom, being pinched between adjoining type, and for this reason I use a striker 320, operating upon the principles disclosed in my Patent No. 604,305, dated May 17, 1898, and in this instance the striker 320 is pivotally connected to the lower end of vertical swinging arms 319 in front of the ejectors, and the striker projects rearward and lies normally with its its inner edge close under the channel $a$. Springs $320^a$ are attached to the striker and the swinging arms 319, so as to normally swing the striker upward as the arms swing inward, so that the striker-blade will act effectively upon any partially-ejected spaces in the line and complete the discarding thereof. The arms 319 are moved at the proper time by links 343, which are connected to swinging arms 318, provided with cam-rollers which are pressed against cams 386, fixed on the shaft 380. Stout springs $318^a$ are employed to hold the arms 318 against the cams and to swing the striker inward, when permitted to do so, by the cams 386, said cams 386 and levers 318 forcing the striker quickly outward against the action of spring $318^a$ and keeping it outward except for the moment when it must act, the springs producing very rapid, efficient, and powerful action of the striker for the purpose of ejecting the spaces.

It sometimes happens that spaces may be partially ejected from the line and hang there just when the line is going to be forwarded, and if the line is forwarded with the spaces in this condition some of the type are apt to lie askew or diagonally of the channel, so that when the ejectors descend they will strike the twisted type and will break the latter. To prevent such accidents, therefore, I employ the liner-plate 592, which operates oppositely to the striker 320. Liner-plate 592 is attached to swinging levers 593, connected by a link 594 to one end of a bell-crank 595, the other end of which presses against a cam 596, attached to a sleeve on shaft 379 and driven simultaneously with the pinion 377, to which it is made fast, as hereinafter described. A spring $595^a$ is attached to lever 595, so as to hold the same against the cam 596 and throw the liner-plate 592 quickly outward when the cam 596 permits such action. The liner-plate 592 is so arranged that it is pushed forward under the line of type just before the line is moved lengthwise under the channel $a$ and if any other spaces have dropped from the liner 592 pushes them back, thus restoring proper alinement of the type in the channel, so that when the plunger 353 acts on the line of type all the type will move forward parallel and straight in the channel. Furthermore, the liner 592 forms a kind of movable false bottom for the channel $a$ beneath the ejectors, at which point, of course, the channel is very open, as there is only a shallow groove at each side of the channel, just sufficient to hold the proper length types in place. The liner will thus assist in upholding the type and spaces in channel $a$ until the ejectors are ready to act.

As above stated, the discarder mechanism is actuated from cams on the shaft 380, which latter is driven by gear 381 from the gear 377 on shaft 379, and gear 377 is intermittently locked to the shaft 379 by automatic clutch mechanism, as follows: On the hub of bevel-gear 376, (which is keyed to shaft 379 and by which the latter is continuously driven from a bevel-gear $427^a$ on shaft 427,) is fixed a ratchet 286, provided with one or more opposite notches or teeth, which are adapted to be engaged by a dog 282, pivoted on a disk 287, which is fixed on the hub of gear 377, (loosely journaled on shaft 379.) Of course when dog 282 engages the ratchet 286 disk 287 and gear 377 will be locked to the shaft 379 and rotate therewith. A spring 278 is attached to disk 287 and bears against the tail of dog 282 and continuously tends to throw it into engagement with the ratchet 286; but this tendency of the spring is overcome by means of a lock-lever 283, which is pivoted on the fixed support beside the edge of a disk 287 and one of its ends is upturned, as shown, so as to engage a protuberance on the tail of the dog 282 and cause the dog to rock on its pivot on the disk 287 and disengage it from the ratchet 286. (See Fig. 9.) The other end of lock-lever 283 is provided with a lateral lug $283^b$, which lies close to the periphery of disk 287 and is adapted to be engaged by a cam $287^b$ on said disk, so that the lock-lever will be rocked by the cam and its other end will be thrown into position to engage the dog 282 and cause the latter to disengage ratchet 286. This cam $287^b$ and lock-lever are so proportioned that just as the dog disengages the ratchet 286 the lug $283^b$ clears the cam $287^b$; but just prior to this disengagement a pivoted catch 273, mounted on the rock-shaft 274, is thrown under the curved end of the lock-lever and locks it in position to hold dog 282 disengaged from ratchet 286, as shown. So long as the dog is disengaged from ratchet 286 the spring 278 is of course under tension; but as soon as catch 273 is moved so as to release the lock-lever spring 278 will immediately throw the dog into engagement with ratchet 286, which is continuously rotating, and thereby immediately sets the gear 377 in motion and therethrough sets in motion the operative parts of the discarding mechanism. The gear 377 will continue to rotate so long as catch 273 is kept out of engagement with the lock-lever.

Catch 273 is operated by means of an arm 267 on rock-shaft 274, which arm is connected by a rod 339 to one end of a rocking lever 272, the other end of which is provided with a roller $272^a$, which bears upon a peripheral cam 360, mounted on the tubular shaft 364 of cam 362, as shown. A spring $272^b$ is attached to lever 272 and will hold its roller against cam 360 and also keep catch 273 in position to lock the lever 283 until it is released by the positive action of the cam 360. Thus the space-discarding mechanism is controlled from the same cam-shaft that controls the movement of the line-propelling lever 527, and the parts are so constructed and timed relatively to each other that the line of type will be moved forward under the ejectors four times by the plunger 353, operated from cam 362, and the ejector mechanism will be operated four times during the revolution of cam 362, these operations occurring during the time when the line-shifting plunger 353 is dwelling and the line of type is momentarily stopped in its movement through channel $a$. The discarding mechanism is also so timed that the controller 323 will raise the ejectors and will keep them out of the way each time the line is to be moved in the channel $a$.

As each operation of the discarder mechanism requires a full revolution of shaft 380, such shaft must be rotated four times for each revolution of cam 362. The catch 273 is therefore disengaged from lock-lever 283 at the proper time by cam 360 and kept disengaged until shaft 380 has made four revolutions. Then catch 273 is thrown back in position to lock lever 283 and hold the dog 282 out of engagement with ratchet 286 until another line is to be operated upon and cam 362 is again set in motion. A dog 494 is pivoted on the frame beside disk 287 and is adapted to engage a notch in the disk just as dog 282 is disengaged from ratchet 286, so as to prevent back play of the disk or shaft 380, which might occur on account of the spring-pressure against the several cams on said shaft if the disk was not locked.

*The means for loading the prepared line into the distributing-cylinder.*—When the leads and spaces have been discarded from the line, as above described, the line is then moved onward into position to be loaded into the distributing-cylinder by the following means, while the above-described devices are returned to normal position ready to begin operations upon another line: After the line of type has been acted upon by the ejectors and before plunger 353 is retracted to bring up a new line, the line is taken under control by a secondary plunger 305, working in a guideway just below the continuation of channel $a$, which plunger is adapted to work under plunger 353 (see Fig. 19) when the latter is in its extreme inward position. The plunger 305 carries a spring-pressed plate 307, which when plunger 305 moves under plunger 353 springs up behind the line of type in channel $a$ through a groove or channel $353^b$ in the lower side and inner end of plunger 353, as shown. Then plunger 353 can move outward, while the line will remain under the control of plunger 305. Plunger 305 is provided with a depending plate 306, which is connected by a link 333 to the upper end of a lever 325, which is connected to a rock-shaft 568, to which is attached an arm 326, provided with a friction-roller which engages a peripheral race in a cam 361, keyed to the sleeve 364, on which cam 362 is also keyed, these cams being mounted on such sleeve, which is journaled on a through-shaft $364^a$ for convenience in assembling and removing the parts. The plunger 305 advances the line from the space-discarder mechanism to the elevator, by which the line is diverted from the horizontal into a vertical position directly opposite and parallel with some one of the channels in the distributer 417. The channel $a$, in other words, after it passes the space-discarder turns upwardly at right angles and extends vertically and upwardly parallel with the channels in the distributer. The vertical extension of channel $a$ is formed in a casting 243, which is suitably supported on the main frame, the outer side of the channel therein being closed by a casting 244, as shown. The line-elevator is located at the bend of the channel and consists of a rocking disk 252, provided with a tooth $252^a$, which is moved back and forth by the rocking of the disk and takes the type from plunger 305 and raises the same in the vertical part of channel $a$ until it stands opposite a channel in the distributer 417 and directly behind a horizontally-movable loading-plunger 355, which is guided in an extension of casting 243.

The elevator 252 is fixed on a short shaft 254, which is connected by a short crank $254^a$ to the upper end of a rod 335, the lower end of which is connected to one arm of a bell-crank lever 251, the other arm of which is connected by a link 334 to a slide 256, which moves in a guide 255, attached to the stationary part of the framework just opposite the upper end of lever 328, and slide 256 is provided with opposite lugs 257, which are adapted to be struck by the upper end of lever 328 as the latter reciprocates. A spring $334^a$ is attached to link 334 and a stationary part of the frame and normally pulls the slide inward and holds the line-elevator 252 in the position shown in Fig. 11, so that its lug $252^a$ will not interfere with the advance of the type from the channel $a$. As the lever 328 swings outward, so as to retract the plunger 353, its upper end strikes the outer stud 257 on slide 256 and pulls the slide outward, thereby, through the described connections, rocking the elevator 252 so as to cause its lug $252^a$ to take the line of type which has just been brought forward by plunger 305 and lift such line into the vertical part of channel $a$, and the elevator stops when the lowermost type in the line is exactly in alinement with the base of the discharge-slot $a'$ in the rear side of the type-channel in casting 243 and opposite plunger 355, through which slot $a'$ the type are ejected into the channels of the receiver. The parts are so timed that plunger 305 brings the line of type over and partially beyond the tooth $252^a$ of elevator 252 before said elevator is actuated, and then when said elevator is actuated tooth $252^a$ slips in behind the line of type by depressing tongue 307 out of channel $a$ and pushes the line of type on into the vertical portion of the channel $a$, opposite the slot $a'$, as above described. When the type-line reaches this position and while the elevator is momentarily stopped, the loading-plunger 355 is actuated so as to move the line of type into the channel of the distributer, which is effected very rapidly by the following mechanism: The plunger 355 is mounted to move horizontally in suitable guides attached to the casting 243, as shown, and is connected by hinged links 340 to a double-armed lever 310, which is attached to the upper end of a short vertical shaft 311, journaled in a stationary bracket 313, attached to the frame 400 at the inner side of the space-discarding mechanism, shaft 311 being rocked by means of an arm 312 on its lower end, to which is connected a forked push-rod 314, which embraces the vertical sleeve 370 on shaft 369 and carries a roller $314^a$, engaging a race in the cam 367, keyed to sleeve 370, as shown. This cam is so timed in relation to the other parts of the mechanism that the loading-plunger 355 is operated the moment after elevator 252 has brought the line of type into position directly opposite the loading-plunger.

As previously stated, when this invention is applied to a distributing-machine it is intended to automatically load the empty channels of the distributer, and consequently should operate only when an empty channel is to be filled, and this desired automatic action may be best controlled by providing each channel in the distributer with some device which when its channels are empty will actuate a controlling device by which the loading mechanisms are permitted to operate. For convenience I utilize the follower-weights in the distributer-channels as the means for actuating the tripping device. Each follower 584 therefore is provided with a projecting lug $584^a$, which when all of the type in the channel are exhausted will come into position to actuate the tripping mechanism as follows: On the casting 244 next to the distributer is pivoted a bell-crank trip-lever 264, Figs.

8, 17, and 22, one arm of which normally stands in position to be struck by the lug 584$^a$ of any follower in the distributer-channels which is permitted to drop to the bottom thereof by the distribution or escape of all the type therein. This trip-lever is held in this position by means of a spring 264$^a$ and a stop-pin 264$^b$. (See Figs. 7, 20, 21, and 22.) The other arm of this lever underlies a hook 342$^a$ on the upper end of a rod 342, the upper end of which is guided by means of a slot therein engaging an eccentric-pin 265$^c$ on the end of a rock-shaft 265. This shaft 265 extends to the front of the machine and is provided with a handle 266. By turning the shaft to one position (see Fig. 22) the rod 342 will be moved out of position to engage the trip 264, so that the discarding and loading mechanism will not be tripped or released when lever 264 is rocked. When the shaft 265 is turned to the other position, however, Figs. 20 and 24, the rod 342 is kept in position to engage the trip-lever and be operated thereby, so as to release the discarder and loader. The lower end of rod 342 is pivotally connected to one arm of a bell-crank 341, the other arm of which is connected by a rod 338 to an arm 267 on the horizontal rock-shaft 268, which extends over toward the shaft 369 and has on its outer end an arm 269, which controls the operation of the clutch by which the sleeve 370 is locked to shaft 369. This clutch is constructed very much like the clutch by which gear 377 is locked to shaft 379—that is, it consists of a ratchet-disk 284, (similar to 236,) which is keyed on the shaft 369 below a large cam-disk 368, which is fast to the sleeve 370. On the bottom of cam 368 is pivoted a dog 282', (similar to that already described,) which is normally thrown into position to engage the ratchet 384 by the spring 278'. The sleeve 370 is to be given one revolution each time it is clutched to shaft 369, and for this reason a pivoted shoe 281 is employed, which will at each revolution of the cam 368 engage the tail of the dog 282', as indicated in Figs. 9 and 13, and compel it to disengage ratchet 384. Latch-shoe 281 is held in engagement with the dog 282' by an arm 269 on rock-shaft 268, which arm is held down by means of a spring 269$^a$, so that its free end obstructs the movement of the latch 281. However, whenever shaft 268 is rocked (by trip-lever 264 pulling rod 342 upward) so as to disengage arm 269 from the shoe 281 the spring 278' throws dog and shoe outward, and the dog 282' engages the ratchet 284, and as the latter is continually rotating movement is immediately imparted to cam 368 and through it to sleeve 370, as is obvious. Before the sleeve has made a complete revolution, however, the shoe 281 is thrown back into position to engage pawl 282' by means of the push-rod 270, which is connected to a rocking lever 271, pivoted on a fixed bracket beside cam 262, and its lower arm is provided with a friction-roller 271$^b$, that engages a peripheral cam-surface 271$^a$ on the end of cam 362, as shown. This rod is actuated by the cam immediately after the sleeve 370 begins to rotate so as to push the shoe 281 inward, so that it will cause the pawl 282' to disengage the ratchet 284. When the shoe is returned to this position, the arm 269 drops in front of the shoe and positively locks it. Before cam 362 stops revolving the arm 270 is retracted by the spring 271$^c$, the roller 271$^b$ entering a depressed portion of the cam 271$^a$, and rod 270 remains thus retracted until the trip 264 is again actuated so as to cause arm 269 to disengage shoe 281. It will be noted that the clutch for locking sleeve 370 to shaft 369 is released directly by the action of the trip-lever 264, through bar 342, lever 341, link 338, arm 267, rock-shaft 268, and arm 269, so that each time said trip-lever 264 is actuated by the lug of a follower in one of the distributing-cylinder channels, the discarder and loader is set in operation and permitted to perform one cycle of operations. Each time the trip-lever 264 is operated (provided the bar 342 be in position to engage with the trip) the continuously-rotating shaft 369 is clutched to the sleeve 370 and imparts one full revolution to the latter, and as cams 368, 367, and 365 are all keyed to sleeve 370 all of these cams will be rotated once each time the trip 264 is actuated by the lug of the follower in the empty channel. Of course as the follower in the empty channel of the distributer is at the bottom of the channel some means must be provided for raising such follower prior to the injection of the line of type into such channel, and this operation is provided for and automatically accomplished prior to the actuation of the loading-plunger 355, as follows: The cam 368 operates a lever 324, which is pivoted on a fixed support near the cam, and its shorter arm is provided with a roller 324$^a$, engaging a peripheral groove in cam 368. The long arm of lever 324 is connected by link 337 to a vertically-movable bar 354, which is guided in a casting 246, attached to a casting 243. The upper end of this bar normally lies close to and just below the upper end of trip 264, so that the lug of the follower 584, which actuates the trip, will stop just above the upper end of bar 354. The distributer-cylinder is rotated by a step-by-step motion and comes momentarily to rest immediately after the lug of one of its followers 584 has actuated trip 264, and as soon as sleeve 370 starts to rotate cam 368 oscillates lever 324 and elevates bar 354, the upper end of which catches the lug on the follower 584, which has just actuated the trip and lifts this follower up out of the way of the incoming line of type, which is immediately thereafter shoved into the channel beneath the follower by the loading-plunger 355, which is actuated just after the plunger 584 is elevated by bar 354.

The lever 324 is made to indirectly control the operation of the space and lead discarding mechanisms and line-forwarding plunger 353 by the following devices: When lever 324 has oscillated sufficiently to lift the bar 354, as described, its short arm is depressed and strikes the upper end of a rod 276 and depresses the latter, and this rod 276 is connected to a pivoted latch 275, which controls the clutch mechanism by which motion is imparted from shaft 369 to the shaft 273, which is beneath, but directly in line with, the shaft 369. The clutch whereby shaft 369 is enabled to drive shaft 373 may be constructed like the other clutches already described. On the lower end of shaft 369 is keyed a ratchet-disk 285, (similar to 286,) and on the gear 374, which is keyed to the upper end of shaft 373, is attached a dog 282'', adapted to engage with the ratchet 285. This dog is normally held out of engagement with the ratchet 285 by a shoe 281', which is pivoted to a fixed support and is held in engagement with the dog by a projection on the pivoted arm 275, as shown; but when rod 276 is depressed by the end of lever 324 arm 275 is swung clear of shoe 281' and permits the spring 279 to throw the pawl 282'' into engagement with the ratchet 285, thereby locking shaft 369 to shaft 373. As before stated, gear 374 meshes with a gear 73 on a counter-shaft 372, which has a small bevel-gear 372ª on its other end, meshing with a large gear on the end of cam 362 or on the sleeve 364, on which cams 361 and 362 are mounted, so that both cams are rotated from shaft 373, the gearing being so proportioned, however, that shafts 369 and 373 make five revolutions in order to rotate cams 361 and 362 once. These shafts 369 and 373 remain locked together by the clutch until they have made five revolutions, during which time, however, cams 361 and 362 are rotated but once. Just before the completion of the fifth revolution of shaft 373 shoe 281' is moved inward into position to engage the pawl 282'' and disengage it from ratchet 285 by means of the push-rod 277, which is provided with a collar 291 beside a swinging lever 585, carrying a pin adapted to engage the collar and push the rod 277 outward, and lever 585 is operated by a pin 585ª on the end of cam-disk 362, as shown. As soon as shoe 281' is pushed inward arm 279 springs up behind it and locks the same until rod 276 is again depressed, a spring 275ª being employed to uphold the arm in locking position. The push-rod 277 may be retracted by spring 277ª, connected thereto or to its actuating parts in any suitable manner, as desired.

From the foregoing it will be observed that the operation of cams 361 and 362, which control the line-forwarding and space and lead discarding mechanisms, is controlled by the loading mechanism, the clutch for locking the driving mechanism of said cams to the main driving-shaft 369 being released by the follower-lifter lever 324 immediately after a follower is raised. Thus indirectly the operations of both the loading and discarding mechanisms are controlled by or from the trip-lever 264.

The cam 362 is utilized as the means for causing the disengagement of the clutch between shaft 369 and sleeve 370, so that the loader mechanism stops when said sleeve makes one rotation. The cam 362 also controls the clutch between shafts 369 and 373, by which the cams 361 and 362 are driven, through the described devices, so that the shaft 373 is stopped after making five revolutions or when cams 361 and 362 have made one revolution and the line separating and discarding mechanisms have performed one cycle of operations.

The rods 270 and 277, which control the clutches, are shifted only at the proper times, so that the loading and discarding mechanisms cannot act except at the proper time. Each mechanism must perform a complete cycle of operations before the other begins to again operate, the loader operating and then waiting until the line separating and discarding mechanisms have operated before it can again operate, and vice versa.

The vertical slot $a'$ in casing 243, which communicates with the vertical portion of channel $a$ and through which the type-line is ejected laterally into the reservoir, as indicated in Figs. 8 and 18, is a very narrow slot, but of course must be open, so as to permit the escape of the type therethrough; but in order to prevent any type accidentally jarring out of line and projecting through the slot $a'$ before the loading-plunger 355 operates I employ a guard 357, which consists of a narrow plate provided with diagonal slots 357ª, which engage suitable fixed guide-pins 357ᵇ. This plate is arranged at the inner side of slot $a'$, and when it is depressed by spring 357ᶜ the slots and guide-pins cause it to partially close over the edge of the channel, as indicated in Fig. 17, and thus to effectually prevent any type prematurely escaping therefrom. The plate 357 is notched at its upper end to engage the shorter arm of a bent lever 501, pivoted on casting 244, the longer arm of lever 501 projecting into the path of the follower lifter-rod 354, so that when rod 354 is raised lever 501 will be rocked, so as to lift the plate 357, and in lifting it the pins and slots cause it to move away from the edge of the channel and uncover the latter during the time that the loader is ejecting a line of type through the channel into the distributer. When a line is ejected and the bar 354 descends, plate 357 also descends, so as to again partially close the slots $a'$.

I find it advantageous to line or face one or more sides of channel $a$ with felt or fiber to give an easy friction upon the types, (sufficient to prevent their casual slipping in the channel or turning over therein.) The felting may be arranged as shown in Figs. 19 and 24, a strip $f$ being secured to the top of the channel $a$, between the line-separating and space-discarding mechanism, and another strip F being secured to the top wall of the channel between the space-discarders and the elevator. The strip of felt f may extend from the discarding mechanism to and around the line-elevator disk 252, the periphery of which is provided with suitable grooves, as shown, to accommodate the felt without interfering with the action of the line-lifting lug 252ª.

Operation: The operations of the several mechanisms which constitute the space and lead discarder and distributer-loader have been already clearly explained in connection with each part. Therefore detailed explanation thereof here is unnecessary. I will, however, briefly recapitulate the operation of the apparatus, as follows: All the operative parts of the discarding and loading mechanisms, it will be observed, are driven directly or indirectly from the shafts 369 and 379, both of which shafts are driven continuously by gearing from the shaft 427, which operates the distributing-cylinder and which is driven continuously. Whenever a channel in the distributing-cylinder is emptied of type, the follower therein drops until its lug contacts with trip-lever 264 and rocks the same thereby through the described connections, releasing the clutch by which sleeve 370 is locked to shaft 369, whereupon the sleeve commences to revolve with its cams. Immediately the follower in the channel of the distributing-cylinder 417, which has just actuated the trip-lever, is lifted by the bar 354, which is operated once by lever 324 from the cam 368. A line of type is then loaded into the distributer-cylinder by the loading plunger 355, which is operated by the cam 367, and simultaneously a new line of type is moved from the dead-matter in the galley into the channel $a$ by the plunger 269, which is operated by the cam 365. The three cams 365, 367, and 368, therefore, are only rotated once for each operation of the loading mechanism and are therefore mounted upon a single sleeve which is controlled by one clutch mechanism, by which the sleeve is locked to shaft 369 each time the trip 264 is actuated by a lug on the follower in the receiver, as above described. After the line has been loaded into the distributer it is necessary that another line of type be made ready for loading into the cylinder, and therefore no sooner has the line been brought into the channel $a$ than cams 361 and 362 are set into operation by lever 324, the shorter arm of which strikes rod 276 and causes it to release the clutch which locks shaft 373 to shaft 369, and thereupon the shaft 373 begins rotating and through intermediate gearing rotates cams 361 and 362. Cam 362 first causes rod 336 to drop bottom 379, so as to discard the lead left thereon by the plunger 298, as the latter has just ejected a line of type into channel $a$, the bottom 379 being returned to position before plunger 296 is retracted. Next cam 362, through lever 527, actuates plunger 353 and moves the line of type step by step forward in channel $a$ toward the loader, bringing the line under the ejectors 299 300 of the space-discarding mechanism. The cam 362 also (through lever 272, rod 339, and connections) releases the clutch of the gearing that drives the ejector cam-shaft 380, and the parts are so timed that each time the plunger 353 dwells the ejectors operate upon the line and discard spaces therefrom. After the spaces are discarded and just as plunger 353 is to be retracted the line-forwarding slide 305 comes into operation (being actuated by lever 325 from cam 361) and moves the line onto the line-elevator 252 (which is operated indirectly from cam 362 by lever 328, slide 256, link 334, lever 251, and link 335) and at the proper time raises the line into position before the loading-plunger 355 and holds it there until it is ejected into a distributer-channel by such loader. When sleeve 370 has made one revolution, its clutch is disengaged from shaft 369, (by the shoe 81, operated by rod 270 and lever 271 from cam 362,) and as soon as line-forwarding plunger 353 has completed its inward movement the clutch for driving the discarder cam-shaft 380 from shaft 379 is thrown out of action from cam 362 by means of lever 272, link 339, shaft 274, and catch 273, and when cam 362 has about completed one revolution the clutch-locking shaft 373 to shaft 369 is thrown out of action by means of push-rod 277, actuated from cam 362 by lever 585, and the parts then remain at rest until trip 264 is again actuated by another follower in the distributer contacting therewith, whereupon the aforesaid cycle of operations is repeated. This is a general statement of the operation of the principal mechanism of the apparatus. Other and minor operations are explained hereinbefore in the detailed specification of the several particular mechanisms.

In order that sufficient time may be given for the action of the discarding mechanisms and to insure that every space will be discarded from the line, I preferably allow a longer time for the action of the discarding mechanism than for the loader by permitting the cams 361 and 363 to occupy the time of five revolutions of shaft 369 in making one rotation, and also in order that the discarders may operate a series of times upon the line as it is passed through the channels $a$ shaft 380 is arranged to be rotated four times during four-fifths of a revolution of cams 361 and 362, so that the line of type may be intermittently pushed forward four times in the channel $a$ by the action of cam 362 with the connections described, and in the interval between each intermittent movement of the line the space-discarders are operated. Thus each line is presented in at least four different positions to the action of the discarders, so that all the spaces therein will be found and discarded before the line is moved on the loader. As the cams 365, 367, and 368, therefore, must make one revolution to each revolution of cams 361 and 362 within the time of one-fifth of a revolution of cams 361 and 362 and as the discarding mechanism must be operated four times during the rotation of cams 361 and 362 and only during the time of four-fifths of a revolution of said cam, it is necessary to employ the various clutch mechanisms or their equivalents which I have described; but with the principles of the operation of the machine made clear it is obvious that the construction thereof may be considerably varied and modified within the scope of my invention.

The discarding and loading mechanisms cease operating when a line is prepared and in position in front of the plunger ready to be loaded into the distributer, and when the loading mechanism is again set in operation this line will be loaded instantaneously into the distributer and a new line be taken from the galley, the leads and spaces discarded therefrom, and the line taken over into position in front of the loading-plunger, so that there will always be a line of type ready to be loaded into the distributer when the discarder and loader come to a standstill after making one cycle of operations.

I have described a complete and practical apparatus; but it is obvious that the invention is capable of embodiment in different forms and that many minor changes can be made in the constructions of parts within the scope of my invention, and therefore I refer to the claims hereto appended for a concise summary of such features and combinations of parts as I desire to protect by this application and Letters Patent which may be granted thereon.

I do not herein claim, broadly, the automatic loading of lines of type into the channels of the distributing-cylinder. Neither do I claim, broadly, the employment of lugs on the followers in the distributer-channels to actuate the tripping mechanism whereby the loader is started in operation.

Having thus described my invention, what I therefore claim as new, and desire to secure by Letters Patent, is—

1. The combination of a hinged galley-holder, a sliding plunger connected to the end thereof, and means for operating said plunger when said galley is in a vertical position, substantially as described.

2. The combination of a hinged galley-holder, a sliding plunger connected to the end thereof and movable therewith, a sliding plate below the holder and hinged to said plunger, and means for operating said plate, substantially as described.

3. The combination of a hinged galley-holder, a plunger connected to the end thereof, a sliding plate for operating said plunger, hinged thereto, said plate being adjustable so as to bring the hinge or pivot of the plunger into line with the pivot or hinge of the galley when the galley is to be lowered, for the purpose and substantially as described.

4. The combination of the galley hinged at its lower end, a reciprocating plunger-guide in the lower end of the galley, said plunger forming the end of the galley when the latter is turned down and the movable bottom therefor when it is turned up, and means for reciprocating said plunger, substantially as described.

5. The combination of the galley hinged at its lower end, a reciprocating plunger guided in the lower end of the galley, adapted to eject lines of type therefrom, a reciprocating plate for operating said plunger and hinged thereto, and means for reciprocating said plate, said plunger forming the end of the galley when the latter is turned down and a movable bottom therefor when it is turned up.

6. The combination of the galley hinged at its lower end, a reciprocating plunger guided in the lower end of the galley, adapted to eject lines of type therefrom, means for operating said plunger hinged thereto, and detachable connections between said plunger and its operating devices whereby the plunger can be shifted so as to bring its pivots into line with the pivots of the galley when the galley is to be lowered.

7. The combination of the galley hinged at its lower end, a reciprocating plunger mounted in the lower end of the galley, adapted to eject lines of type therefrom, a reciprocating plate for operating said plunger and hinged thereto, means for reciprocating said plate, said plunger forming the end of the galley when the latter is turned down and a movable bottom therefor when it is turned up, and detachable connections between said plate and its operating devices, whereby the plate can be shifted so as to bring the pivots of the plunger into line with the pivots of the galley when the galley is to be lowered.

8. The combination of the hinged galley-holder, the sliding plunger guided in the bottom thereof and adapted to eject the lines of type therefrom when the galley is in raised position and to form the end of the galley when it is in lowered position, and the adjustable holder-block attached to said holder for retaining galleys of different sizes therein, substantially as described.

9. The combination of the hinged galley-holder, the sliding plunger guided in the bottom thereof, and adapted to eject the lines of type therefrom when the galley is in raised position, and the adjustable holder-block attached to said holder for retaining galleys of different sizes therein; with a sliding plate hinged to said plunger, a cam and lever for operating said plate, and means for disconnecting said plate from said actuating-lever to permit the plate to be drawn backward so as to bring the hinges of the plunger in line with the hinge of the galley when the latter is to be lowered, substantially as described.

10. The combination of the galley composed of the hinged plate 302, the opposite side castings, and the adjustable galley-retaining block slidably mounted on plate 302, substantially as described.

11. The combination of the galley-holder composed of a plate 302 hinged to a fixed bracket, the opposite side plates attached to said bracket, the weight guide-bar attached to said plate, and the plunger 298 guided in said plate; with the slide 297 hinged to said plunger, means for reciprocating said slide, and means for shifting said slide to bring the hinges of the plunger and galley into line when the galley is to be lowered.

12. The combination of the galley-holder, the weight guide-bar attached thereto, and the adjustable galley-holding block slidably mounted in said galley-holder; with the plunger 298 guided therein, the slide 297 hinged to said plunger, means for reciprocating said slide, and means for disconnecting said slide from its operating mechanism, thereby permitting the slide to be shifted to bring the hinges of the plunger and galley into line when the galley is to be lowered.

13. The combination of the galley-holder composed of a casting 302 hinged to the fixed bracket, the opposite side plates attached to said bracket, the weight guide-bar 532 attached to said plate and the adjustable block 304 slidably mounted on said plate; with the plunger 298 guided therein, the slide 297 hinged to said plunger, means for reciprocating said slide, and means for disconnecting said slide from its operating mechanism, thereby permitting the slide to be shifted to bring the hinges of the plunger and galley into line when the galley is to be lowered.

14. The combination of the galley-holder, the weight guide-bar attached thereto, the sliding weight on said bar and the follower attached to said weight.

15. The combination of the galley-holder, and the adjustable galley-retaining block 304 slidably mounted therein, with the guide-bar, the adjustable weight thereon, and the follower attached to said slide, substantially as described.

16. The combination of the galley-holder and the adjustable galley-retaining block 304; with the guide-bar 532, the adjustable weight 535 thereon, and the follower 534 attached to said slide having an extensible portion 536, substantially as described.

17. The combination of the galley composed of the hinged plate 302, the opposite side castings, and the adjustable galley-retaining block 304 slidably mounted on plate 302; with the guide-bar 532, the adjustable weight 535 thereon, and the follower 534 attached to said slide having an extensible portion 536, for the purpose and substantially as described.

18. The combination of the holder for dead-matter, the plunger for ejecting lines therefrom, and the movable bottom below said plunger adapted to support the type when the plunger is retracted, and to retain the leads when the plunger is projected, and means for moving said bottom so as to discard the lead while the plunger is projected.

19. The combination of the holder for dead-matter, the plunger for ejecting leads therefrom, and the removable and changeable bottom below said plunger mounted on a hinged support and adapted to support the type when the plunger is retracted, and to retain the leads when the plunger is projected, and means for dropping or tilting said bottom so as to drop the lead while the plunger is projected.

20. The combination of a holder for dead-matter, a plunger for ejecting the lowermost line therefrom, means for reciprocating said plunger, a movable bottom below said plunger, mounted on a tiltable or hinged support, said bottom being interchangeable with others of different thicknesses according to the leading of the matter being treated, means for operating said plunger so as to project a line of type over the bottom, and means for tilting the bottom while the plunger is projected therefrom so as to drop the leads lying upon the bottom, for the purpose and substantially as described.

21. The combination of the tiltable holder for dead-matter, the plunger attached to the bottom of said holder, and means for operating said plunger, a hinged plate adapted to form the bottom of the holder when the latter is raised to a vertical position, said bottom underlying the plunger when the latter is projected and supporting the type when the plunger is retracted, and means for tilting said bottom when the plunger is projected so as to drop the leads lying on the bottom.

22. The combination of a hinged galley-holder, the sliding plunger attached to the hinged end thereof, the sliding plate hinged to said follower, and means for operating said plate; with the removable and interchangeable plate attached to a hinged support and adapted to support the type in the galley when the latter is in raised position, said plate underlying the plunger, and adapted to retain the lead when the plunger is actuated to move a line of type from the galley, and means for tripping or tilting said plate when the plunger is projected, so as to drop the lead, for the purpose and substantially as described.

23. The combination of the tiltable holder for dead-matter, the plunger attached to the bottom of said holder, means for operating said plunger, a movable bottom below said plunger, mounted on a tiltable or hinged support, said bottom being interchangeable with others of different thicknesses according to the leading of the matter being treated, said bottom underlying the plunger when the latter is projected and supporting the type when the plunger is retracted, and means for tilting said bottom when the plunger is projected so as to drop the leads lying on the bottom.

24. The combination of the galley hinged at its lower end, a reciprocating plunger guided in the lower end of the galley, adapted to eject lines of type therefrom, and a reciprocating plate for operating said plunger and hinged thereto, means for reciprocating said plate, said plunger forming the end of the galley when the galley is in raised position; with a removable and interchangeable bottom plate attached to the galley-support, and means for tilting the bottom when the plunger has ejected a line of type and overlies the bottom so as to drop the discarded leads, for the purpose and substantially as described.

25. The combination of the galley-holder, the plunger for ejecting type therefrom, and the adjustable block in the galley, and the tumbler pivoted to said block adapted to be raised by the plunger when the latter is ejected and to drop into the slot when the plunger is retracted, and prevent the end type twisting out of line.

26. The combination of the hinged galley-holder, the sliding plunger attached to the end thereof, the adjustable galley clamp-block attached to said holder, and the tumbler pivoted to said block and adapted to prevent end type twisting out of line when the plunger is retracted.

27. The combination of the hinged galley-holder, having a base-plate 302, the sliding plunger 298 attached to said plate, the galley clamp-block 304 adjustably attached to said plate, and the tumbler 308 pivoted in a recess in the inner end of said block and adapted to prevent end type getting out of line when the plunger is retracted.

28. The combination of a series of space discarders or ejectors, means for moving a line of type therepast, a movable bar adapted to catch and actuate any ejector which has found a space, and the swinging links supporting said bar, whereby it is given an outward movement as it is swung downward and a rearward movement as it swings upward.

29. The combination of a series of vertically-movable ejector-fingers, means for moving a line of type therepast, and means for lowering said ejectors onto the type; with a movable bar adapted to catch and actuate any ejector which has found a space, the swinging links supporting said bar, whereby the bar is given an outward movement as it is swung downward and a rearward movement as it swings upward, the cam-actuated lever for forcing said bar downward, and the spring for returning the same to normal position, substantially as described.

30. The combination of a series of sliding space-ejectors, and mechanism for moving a line of type therepast; with a movable bar for positively actuating any ejector which has found a space, the slide supporting said plate, and the links suspending said slide on a movable support, a cam-actuated lever for actuating said slide, connected thereto by a link, said links being so disposed as to cause the actuating-bar to swing outward as it is moved downward and to swing inward as it is moved upward, for the purpose and substantially as described.

31. The combination of a series of space-ejectors, means for moving a line of type therepast, means for bringing the ejectors into contact with the type, a movable bar adapted to actuate any ejector which has found a space, a slide supporting said bar, the links suspending said slide from vertically-movable bars, and the cam-actuated lever for operating said slide, connected thereto by a link, and springs for raising said bar, for the purpose and substantially as described.

32. The combination of a series of space-ejectors, means for moving a line of type therepast; a sliding cam-actuated controller-plate adapted to draw the ejectors out of the way of the line of type; with a movable bar adapted to positively actuate any ejector which has found a space, the links suspending said bar from a movable frame, and a cam-actuated lever for operating said bar, for the purpose and substantially as described.

33. The combination of a series of space discarders or ejectors, and means for moving a line of type therepast, a sliding controller-plate adapted to draw the ejectors out of the way of the line of type, said controller-plate being suspended on rocking levers, and cams for operating said levers; with a movable bar adapted to positively actuate any ejector which has found a space, a slide carrying said bar, the links suspending said slide from a movable frame, and a cam-actuated lever for operating said slide connected thereto by a link, whereby the bar is given an outward movement as it is swung downward, substantially as described.

34. The combination of a series of spring-controlled space discarders or ejectors, means for moving a line of type intermittently or step by step past the series of ejectors, a vertically-movable controller-plate adapted to lift all the ejectors out of the way of the line of type while the same is moving and to lower the ejectors onto the line of type when the same is stopped; with a movable actuating-bar adapted to actuate any ejector which has found a space, a slide supporting said bar, links suspending said slide from movable bars and a cam-actuated lever for operating said slide, connected thereto by a link whereby the bar is given an outward movement as it is moved downwardly.

35. The combination of a series of spring-controlled space discarders or ejectors, means for moving a line of type intermittently or step by step past the series of discarders, a vertically-movable controller-plate adapted to lift all the ejectors out of the way of the line of type while the same is moving and to lower the ejectors onto the line of type when the same is stopped; with a movable actuating-bar adapted to actuate any ejector which has found a space, a slide supporting said bar, links suspending said slide from movable bars, a cam-actuated lever for operating said slide, connected thereto by a link whereby the bar is given an outward movement as it is moved downwardly, mechanism whereby the controller is raised before the type is advanced and lowered when the type is stopped, and means whereby the actuating-bar is operated each time the line is stopped and after the ejectors are lowered, for the purpose and substantially as described.

36. The combination of space-discarding mechanism, means for moving a line of type therepast, a cam-shaft for operating said discarding mechanism, a continuously-driven shaft, and mechanism whereby the cam-shaft is intermittently driven from said continuously-driven shaft, substantially as described.

37. The combination of space-discarding mechanism, means for moving a line of type therepast, a cam-shaft for operating said discarding mechanism, a continuously-driven shaft, clutch mechanism whereby the cam-shaft is intermittently driven from said continuously-driven shaft, and means whereby the operation of the clutch mechanism is controlled by the line-actuating mechanism.

38. The combination of space-discarding mechanism, a type-channel beside the same, and a cam and connections substantially as described whereby a line of type is moved in said channel past the ejectors; with a continuously-driven shaft, a clutch mechanism for locking said continuously-driven shaft to the discarding mechanism, said clutch being controlled by said line-advancing cam, whereby the discarding mechanism is regulated by the line-advancing mechanism.

39. The combination of a space-discarding mechanism, comprising a series of space-ejectors, a controller-bar and an actuating-bar therefor, a cam-shaft and levers for actuating said discarding mechanism, a line-advancing cam and connections for moving a line of type step by step past the ejectors, a continuously-driven shaft, a clutch mechanism controlled by said line-advancing cam whereby the discarding-mechanism cam-shaft is locked to said continuously-driven shaft, substantially as and for the purpose described.

40. The combination of the discarding mechanism, comprising a series of space-ejectors, a controller-bar, and an ejector-actuating bar, a cam-shaft, and cams and levers for operating said controller and actuating bars; with a line-channel beside the discarding mechanism, a plunger for moving a line of type therein, a line-advancing cam for forwarding a line of type in said channel, and means whereby the line-advancing cam controls the operation of the discarding device, substantially as described.

41. The combination of the discarding mechanism, comprising a series of space-ejectors, a controller-bar, and an ejector-actuating bar; a cam-shaft and cams and levers for operating said controller-bars, a continuously-driven shaft, a gear thereon meshing with a gear on the cam-shaft and clutch mechanism for locking said gear to said continuously-driven shaft; with a line-channel beside the discarding mechanism, a plunger for moving a line of type therein, a line-advancing cam for forwarding a line of type in said channel, and means whereby the line-advancing cam controls the operation of the said clutch mechanism, substantially as described.

42. The combination of a series of space-ejectors, a sliding controller-bar for moving the same into and out of operative position, the crank-levers for actuating said controller, and a cam-shaft and cams thereon for actuating said levers, an actuating-bar adapted to engage any ejector which has found a space, a slide carrying said bar, a link supporting said slide on a movable bar from spring-suspended bars, a lever connected to said slide by a link, and a cam on said cam-shaft for operating said lever; with a continuously-driven shaft and mechanism whereby the cam-shaft is intermittently driven from said continuously-driven shaft.

43. The combination of a series of space-ejectors, a sliding controller-bar for moving the same into and out of operative position, the crank-levers for actuating said controller, and a cam-shaft and cams thereon for actuating said levers, an actuating-bar adapted to engage any ejector which has found a space, a slide carrying said bar, a link supporting said slide on a movable bar from spring-suspended bars, and a lever connected to said slide by a link, and a cam on said cam-shaft for operating said lever; with a type-channel opposite said ejectors, a plunger for moving a line of type through said channels, a cam and connections substantially as described, whereby said plunger is caused to move the line of type step by step past the ejectors; a continuously-driven shaft, and clutch mechanism substantially as described controlled from said line-actuating cam whereby the ejector mechanism is operated each time the line is advanced from said cam.

44. The combination of a series of space-ejectors, a sliding controller-bar for moving the same into and out of operative position, the crank-levers for actuating said controller, and a cam-shaft and cams thereon for actuating said levers; an actuating-bar adapted to engage any ejector which has found a space, a slide carrying said bar, a link supporting said slide on a movable bar from spring-suspended bars, a lever connected to said slide by a link, and a cam on said cam-shaft for operating said lever; with means for forwarding a line of type past said discarding mechanism, a continuously-driven shaft, a pinion thereon meshing with a pinion on the cam-shaft, and clutch mechanism whereby the pinion is intermittently locked to said continuously-driven shaft.

45. The combination of a series of space-ejectors, a sliding controller-bar for moving the same into and out of operative position, the crank-levers for actuating said controller, and a cam-shaft and cams thereon for actuating said levers, an actuating-bar adapted to engage any ejector which has found a space, a slide carrying said bar, a link supporting said slide on a movable bar from spring-suspended bars, and a lever connected to said slide by a link, and a cam on said cam-shaft for operating said lever; with a type-channel opposite said ejectors, a plunger-cam and levers substantially as described, whereby a line of type is moved step by step past the ejectors, a continuously-driven shaft, a pinion thereon meshing with the pinion on the cam-shaft, and clutch mechanism substantially as described controlled from said line-actuating cam, and clutch mechanism substantially as described, whereby the pinion is intermittently locked to said continuously-driven shaft, whereby the ejector mechanism is operated each time the line is advanced by said line-actuating cam.

46. The combination of a series of space-ejectors, a sliding controller-bar for moving the same into and out of operative position, the crank-levers for actuating said controller, and a cam-shaft and cams thereon for actuating said levers, an actuating-bar adapted to engage any ejector which has found a space, a slide carrying said bar, a link supporting said slide on a movable bar hung on spring-suspended bars; a lever connected to said slide by a link, and a cam on said cam-shaft for operating said lever; with a continuously-driven shaft, a pinion thereon meshing with a pinion on the cam-shaft, and clutch mechanism substantially as described, whereby the pinion is intermittently locked to said continuously-driven shaft, a type-channel beside said ejectors, a plunger for moving type into said channel, a cam and levers for actuating said plunger so as to move the type step by step, and a cam on the cam-shaft controlling the said clutch so that the ejector mechanism will be operated when the line is advanced.

47. In a space-discarder, the combination of a series of ejectors, means for actuating the same, a type-channel opposite said ejectors and means for moving a line of type therein; with a striker-plate opposite said ejectors adapted to complete the discarding of any spaces pushed out by the ejectors, swinging arms on which said striker-plate is pivoted, and means for actuating said striker, for the purpose and substantially as described.

48. The combination of a series of space-ejectors, means for actuating the same, a type-channel opposite said ejectors, and means for moving a line of type therein; with a striker-plate opposite said ejectors, swinging arms to which said striker-plate is attached, the springs for pulling said striker-plate inward toward the line of type, and the cams and levers for controlling the operation of said striker-plate, for the purpose and substantially as described.

49. The combination of a series of space-ejectors, a controller-bar for moving the same into and out of operative position, the crank-levers for actuating said controller, and a cam-shaft and cams thereon for actuating said levers, an actuating-bar adapted to engage any ejector which has found a space, a lever and connections for operating said bar from a cam on said cam-shaft, a striker-plate, swinging arms supporting said plate, the links connecting said arms to swinging levers opposite said cam-shaft, and cams on said cam-shaft engaged by said swinging levers.

50. The combination of a series of space-ejectors, a sliding controller-bar for moving the same into and out of operative position, the crank-levers for actuating said controller, and a cam-shaft and cams thereon for actuating said levers, an actuating-bar adapted to engage any ejector which has found a space, a slide carrying said bar, a link supporting said slide on a movable bar, a lever connected to said slide by a link, and a cam on said cam-shaft for operating said lever; with a striker-plate, swinging arms for supporting said plate, the links connecting said arms to swinging levers opposite said cam-shaft, and cams on said cam-shaft for operating said levers, and a spring for holding said levers against the cam.

51. The combination of a series of space-ejectors, a sliding controller for moving the same into and out of operative position, a cam-shaft, a cam thereon and connections for actuating said controller; an actuating-bar adapted to engage any ejector which has found a space, a cam on said cam-shaft and connections for operating said actuating-bar; a striker-plate, a cam on said cam-shaft, and connections for operating said striker-plate; with a type-channel extending between said ejectors and the striker-plate, a plunger for moving a line of type in said channels, a line-advancing cam and connections for operating said plunger, a continuously-driven shaft, a clutch mechanism for locking said cam-shaft to said positively-driven shaft, and means for controlling said clutch from the line-advancing cam-shaft, substantially as described.

52. The combination of a series of space-ejectors, a sliding controller-bar for moving the same into and out of operative position, the crank-levers for actuating said controller, and a cam-shaft and cams thereon for actuating said levers, an actuating - bar adapted to engage any ejector which has found a space, a slide carrying said bar; links supporting said slide on a movable bar, a lever connected to said slide by a link, and a cam on said cam-shaft for operating said lever; a striker - plate, swinging arms supporting said plate, links connecting said arms to swinging levers opposite said cam-shaft, and cams on said cam-shaft for operating said levers; with a type-channel extending between said ejectors and the striker-plate, a plunger for moving a line of type in said channels, a line-advancing cam and connections for operating said plunger, a continuously-driven shaft, a loose gear thereon meshing with a gear on said cam-shaft, a clutch for locking said loose gear to said positively-driven shaft, and means for controlling said clutch from the line-advancing cam-shaft, for the purpose and substantially as described.

53. The combination of the space-discarding mechanism, a type-channel beside the same, and means for moving a line of type through said channel; with means for returning any partially-ejected spaces into line, after the discarder has operated, substantially as described.

54. The combination of a series of ejectors, a horizontally-disposed type-line channel below the same, a liner-plate below said channel adapted to form the bottom thereof, when the ejectors are elevated and during the movement of a line, and means for retracting said liner when the ejectors are lowered into operative position.

55. The combination of space-discarding mechanism, and means for moving a line of type therepast; with a liner-plate adapted to return any partially-ejected spaces into line, and means for operating said plate so as to withdraw the same out of the way when the discarder comes into operation.

56. The combination of a horizontally-disposed type-line channel, a series of movable space-discarding ejectors above the channel, a liner-plate below the channel, a controller for raising and lowering said ejectors; means for retracting said liner when the ejectors are lowered by the controller and for projecting said liner so as to return any partially-ejected spaces into line when the ejectors are raised, substantially as described.

57. The combination of a type-line channel, a series of movable space-ejectors, a liner-plate beside the channel, a controller for moving said ejectors to and from the channel, an actuating-bar for operating any ejector which has found a space, means for retracting said liner when the ejectors are moved to the channel by the controller, and for projecting said liner so as to return any partially-ejected spaces into line when the ejectors are moved away from the channel and before the line is moved, for the purpose and substantially as described.

58. The combination of a space-discarding mechanism the type-channel beside said mechanism, the liner-bar, the swinging arm supporting the same, the link connecting said arm to a cam-actuated lever, and a spring for holding said lever in contact with the cam and for projecting the liner-plate when permitted by the cam, substantially as and for the purpose described.

59. In a space-discarder, the combination of a series of space-ejectors, and means for operating the same, the striker-plate for ejecting any type partially displaced by the ejectors, and means for actuating said striker-plate; with the type-line channel arranged between the ejectors and striker-plate, and the liner-plate underlying said channel, and means for operating said liner, substantially as described.

60. The combination of a series of space-ejectors, the controller-plate therefor, the actuating-bar for said ejectors, and means for operating said controller and actuating-bar, the striker-plate for ejecting any type partially displaced by the ejectors, and means for actuating said striker-plate; with the type-line channel arranged between the ejectors and striker-plate, the liner-plate underlying said channels adapted to be projected thereunder after the ejectors and striker-plate have been operated, and while the line is being moved.

61. The combination of a series of space-ejectors, a sliding controller-bar for moving the same into and out of operative position, a cam-shaft, cams thereon and connections for actuating said controller, an actuating-bar adapted to engage any ejector which has found a space, and a cam on said cam-shaft and connections for operating said actuating-bar; a striker-plate, and cams on said cam-shaft and connections for operating said striker; with a type-channel extending between said ejectors and the striker-plate, a plunger for moving a line of type in said channels, a line-advancing cam and connections for operating said plunger; a continuously-driven shaft, a clutch mechanism for locking said cam-shaft to said continuously-driven shaft, and means for controlling said clutch from the line-actuating cam-shaft, a liner-plate underlying said ejectors, and channel adapted to assist in supporting the type as they are moved under the ejectors, and a cam fixed to the continuously-driven shaft and connections adapted to control the operation of said liner-plate, substantially as and for the purpose described.

62. The combination of a series of space-ejectors, a sliding controller-bar for moving the same into and out of operative position, the crank-levers for actuating said controller, and a cam-shaft and cams thereon for actuating said lever; and an actuating-bar adapted to engage any ejector which has found a space, a slide carrying said bar, links suspending said slide from spring-suspended bars, a lever connected to said slide by a link, and a cam on said cam-shaft for operating said lever; a striker-plate and a swinging arm for supporting said plate, the links connecting said arms to swinging levers beside said cam-shaft, and cams on said shaft for operating said levers; with a type-channel extending between said ejectors and the striker-plate, a plunger for moving a line of type in said channels, a cam and connections for operating said line-plunger, a continuously-driven shaft, a loose gear thereon meshing with a gear on said cam-shaft, a clutch for locking said loose gear to said continuously-driven shaft, and means for controlling said clutch from the line-actuating cam-shaft, a liner-plate underlying said ejectors, a channel, the link and levers for actuating said liner, and a cam on the continuously-driven shaft adapted to control the operation of said liner-plate, substantially as and for the purpose described.

63. The combination of a type-line channel or holder, a plunger for forwarding a line of type therein, a line-advancing cam and connections for operating said plunger, means for separating a line of type from a galley of dead-matter and introducing the same into said line-channel, a space-discarding mechanism adapted to operate upon the line as it is moved through said channel; with a continuously-driven shaft, clutch mechanism for locking said shaft to the discarder-operating mechanism, and mechanism substantially as described whereby the line-advancing cam controls the operation of the said clutch.

64. The combination of a type-line channel or holder, a plunger for forwarding a line of type therein, a line-advancing cam and connections for operating said plunger, means for separating a line of type from a galley of dead-matter and introducing the same into said line-channel, a space-discarding mechanism adapted to operate upon the line as it is moved through said channel, said line-advancing cam being constructed to give the line a step-by-step movement past the discarders, and said discarder mechanism being adapted to operate several times during each rotation of the line-advancing cam, and means for stopping the line-advancing cam at each rotation thereof.

65. The combination of a type-line channel or holder, a plunger for forwarding a line of type therein, a line-advancing cam and connections for operating said plunger, means for separating a line of type from a galley of dead-matter and introducing the same into said line-channel, a space-discarding mechanism adapted to operate upon the line as it is moved through said channel, said line-advancing cam being constructed to give the line a step-by-step movement past the discarders, and said discarder mechanism being adapted to operate several times during each rotation of the line-advancing cam; with a continuously-driven shaft, clutch mechanism for locking said shaft to the discarder-operating mechanism, and mechanism substantially as described whereby the line-advancing cam controls the operation of the said clutch, whereby the discarding mechanism is set into operation after a line-advancing cam begins to operate and is stopped before the line-advancing cam ceases to rotate, and means for stopping the line-advancing cam at each rotation thereof.

66. The combination of a type-line channel, the plunger for moving the type therein, a cam, the cam-actuated lever, and the plunger-actuating lever connected to the cam-actuating lever by double links, substantially as described.

67. The combination of the ejector mechanism, a channel for conducting type thereto, a plunger in said channel, the lever for operating said plunger, a link connecting the lower end of said lever to a fixed support, a pivoted cam-actuated lever, a link connecting the movable end of said cam-actuated lever to said plunger-actuating lever, and a rotating cam for actuating said cam-lever.

68. The combination of the space-discarder mechanism, the cam-shaft for operating the same, the line-channel beside said discarder, a plunger therein, and a cam and lever for operating said plunger, a continuously-driven shaft, a clutch mechanism for intermittently driving said plunger-actuating cam from said shaft, a second continuously-driven shaft, and clutch mechanism whereby said discarder cam-shaft is intermittently driven from the second continuously-running shaft, and means for controlling said discarder-clutch mechanism from the line-actuating cam-shaft.

69. The combination of a type-channel, a plunger for forwarding the type therein, the line-plunger-actuating cam, connections for operating said plunger from said cam, and means for intermittently rotating said line-actuating cam; with the space-discarding mechanism adapted to operate upon the line of type moved through said channel, the cam-shaft for operating the discarder mechanism, a continuously-driven shaft beside said discarder cam-shaft, a loose gear on said continuously-driven shaft meshing with a gear on the discarder cam-shaft, a clutch for locking said pinion to said continuously-driven shaft, and a cam and connections substantially as described whereby said clutch is controlled from the line-actuating cam-shaft.

70. The combination of a continuously-driven shaft, the ratchet thereon, the disk opposite the ratchet, a dog pivoted on said disk adapted to engage the ratchet, a spring for throwing said dog into engagement with the ratchet, the lock-lever or shoe adapted to disengage the dog from the ratchet, a catch for holding said lever in position to engage the dog, means for tripping said catch, and a cam on said disk adapted to engage the lock-lever and throw it in position to disengage the dog from the ratchet, for the purpose and substantially as described.

71. The combination of the continuously-driven shaft, a ratchet thereon, a disk loosely mounted on the shaft beside the ratchet, the spring-actuated dog 282 on said disk, the pivoted lock-lever or shoe beside the dog having a lug on one end adapted to engage a cam on the disk, whereby it is thrown in position to cause the dog to disengage the ratchet, and a catch for holding the lock-lever in position to engage the dog.

72. The combination of the continuously-driven shaft, a ratchet thereon, a disk loosely journaled on said shaft beside the ratchet, the spring-actuated dog on said disk, the pivoted lock-lever beside the dog adapted to cause the dog to disengage the ratchet, and a catch for holding the locking-lever in position to engage the dog; with space-discarding mechanism, a cam-shaft for operating such mechanism, a gear on said shaft meshing with a pinion fixed to said disk, a line-channel beside the ejector mechanism, a line-advancing cam and connections adapted to move the line past the ejectors, and the lever and connections whereby said catch is controlled by said line-advancing cam.

73. The combination of the continuously-driven shaft, a ratchet thereon, a disk loosely mounted on the shaft beside the ratchet, the spring-actuated dog 282 on said disk, the pivoted lock-lever 283 beside the dog having a lug on one end adapted to engage a cam on the disk, whereby it is thrown in position to cause the dog to disengage the ratchet, and a catch 267 for holding the locking-lever in position to engage the dog; with space-discarders, a cam-shaft for operating such discarders, a gear on said shaft meshing with a pinion fixed to said disk, a line-channel beside the discarders, a plunger in said channel, a lever for operating said plunger, a cam for operating said lever so as to move the line past the ejectors, a second cam on the line cam-shaft, and the lever and connections whereby said catch is controlled by said line-actuating cam, substantially as described.

74. The combination of the galley, the series of space-discarders beside the galley, the type-channel extending past said discarders, and means for ejecting a composed line of type from the galley into said channel; with a plunger for moving said line of type along in said channel to the space-discarders, and a second plunger adapted to continue the movement of said line of type past the discarders when the first plunger is retracted, substantially as described.

75. The combination of the galley-holder, the space-discarder beside the galley, the channel leading from the galley-holder past the discarders, means for ejecting a line of type from the galley into said channels, a plunger for moving said line of type in the channels past the ejectors; a second plunger adapted to continue the movement of said line of type when the first plunger is retracted, and means substantially as described for operating said plungers so as to move the same toward and from each other, for the purpose and substantially as described.

76. The combination of the type-line channel, the plunger therein, a sliding plate working below said channel, and the spring-plate on said sliding plate adapted to spring up behind the line of type so as to give the slide control thereof when the plunger is retracted.

77. The combination of the channel, the guideway below the channel and communicating therewith through an opening in the adjoining side of the channel, a plunger for forwarding a line of type in said channel, a slide working in said guideway, a spring-pressed plate connected to said slide and adapted to take under the plunger and engage and take control of the line of type when the plunger is retracted, and means for operating said plunger and slide, for the purpose and substantially as described.

78. The combination of a series of space-discarders, a type-line channel beside the same, means for introducing a line of type into said channel and a plunger for forwarding a line of type therein toward the discarders; with a slide moving below the channel and opposite the discarders, a spring-plate on said slide adapted to enter the said channel through an opening in the bottom thereof to take control of the line of type when the plunger is retracted, and means for operating said plunger and said slide so as to move the same toward and from each other, for the purpose and substantially as described.

79. The combination of the type-channel having horizontal and vertical portions, an oscillating line-elevator located at the bend of said channel, adapted to move a line into the vertical portion thereof and momentarily support it therein, and means for forwarding a line of type to said line-elevator.

80. The combination of the space-discarder, the space-channel beside said discarder, deflected at right angles, an oscillating or rocking line-elevator at the bend of said channel, means for operating said line-elevator, and means for forwarding a line of type from said discarder to the line-elevator, substantially as described.

81. The combination of a type-channel bent at right angles, the rocking line-elevator 252 at the bend of said channel adapted to move type therepast, and means for rocking said elevator, and means for forwarding a line of type in said channel to said elevator, substantially as described.

82. The combination of a type-channel bent at right angles, the rocking line-elevator 252 at the bend of said channel adapted to move type therepast, and means for rocking said elevator, and means for forwarding a line of type in said channel to said elevator; with a lining of felt in that portion of the channels adjoining the elevator, said felt extending around said line-elevator and lying in peripheral channels therein, for the purpose and substantially as described.

83. The combination of the distributing-cylinder, a type-channel beside the same having horizontal and vertical portions, an oscillating line-elevator located at the bend of said channels adapted to move a line into the vertical portion thereof and momentarily support it therein, means for forwarding a line of type to said line-elevator; with means for loading the line of type in the vertical part of the channel into the distributing-cylinder, substantially as described.

84. The combination of a distributing-cylinder, the space-discarder, the space-channel beside the same, deflected at right angles beside the distributing-cylinder, an oscillating or rocking line-elevator at the bend of said channel, means for operating said line elevator, and means for forwarding a line of type to said discarder and submitting the same to the action thereof and means for forwarding the line to the line-elevator; with means for loading the line of type in the vertical part of the channel into the distributing-cylinder, substantially as decribed.

85. The combination of the distributing-cylinder, a type-line channel having one part lying parallel with and opposite the channel in the distributer, means for forwarding type in said channel, and space-discarding mechanism adapted to operate upon the type as it is forwarded through said channel, and means for ejecting type from the vertical portion of said channel into the channel of the distributer.

86. The combination of the distributing-cylinder, a type-line channel having one part lying parallel with and opposite the channel in the distributer and having one portion extending at right angles from the vertical portion thereof, and a line-elevator at the bend of the channel; with means for forwarding type in said channel, space-discarding mechanism adapted to operate upon the type as it is forwarded through said channel, and means for ejecting type from the vertical portion of said channel into the channel of the distributer.

87. The combination of a distributing-cylinder, means for loading a line of type therein, means for separating a line of type from dead-matter, means for forwarding the separated line to the loader, and space-discarding mechanism adapted to operate upon the line between the galley and the loading mechanism.

88. The combination of a distributing-cylinder, means for loading a line of type therein, means for separating a line of type from dead-matter, and means for discarding leads therefrom, means for forwarding the separated line of type to the loader, and space-discarding mechanism adapted to operate upon the line between the galley and the loading mechanism, to separate the spaces therefrom, substantially as described.

89. The combination of a distributing-cylinder, means for loading a line of type therein, means for separating a line of type from dead-matter, means for forwarding the separated line of type to the loader, and space-discarding mechanism adapted to operate upon the line before it reaches the loading mechanism, to separate the spaces therefrom, a trip actuated from an empty channel in the distributing-cylinder for releasing the loading and discarding mechanisms.

90. The combination of a distributing-cylinder, means for loading a line of type therein, means for separating a line of type from dead-matter, means for forwarding a separated line of type to the loader, and space-discarding mechanism adapted to operate upon the line in said channel to separate the spaces therefrom; with a trip actuated by the follower in the distributing-cylinder for releasing the loading mechanism, trip devices controlled by the loader mechanism for releasing the line-advancing mechanism, and trip devices controlled by the line-advancing mechanism for releasing the space-discarding mechanism.

91. The combination of a distributing-cylinder, means for loading a line of type therein, means for separating a line of type from dead-matter, means for forwarding the separated line of type to the loader, and space-discarding mechanism adapted to operate upon the line before it reaches the loading mechanism, to separate the spaces therefrom; a trip actuated by a follower in the distributing-cylinder channel for releasing the loading and discarding mechanisms; with means for stopping the loading mechanism after it has completed one operation until the other mechanisms have operated, means for stopping the discarder mechanism prior to the stopping of the line-forwarding mechanism and means for stopping the line-forwarding mechanism after it has completed one cycle of operations.

92. The combination of a distributing-cylinder, means for loading a line of type therein, means for separating a line of type from dead-matter, means for forwarding a separated line of type to the loader, and space-discarding mechanism adapted to operate upon the line between the dead-matter holder and the loading mechanism, to separate the spaces therefrom; with a trip actuated by a follower in the distributing-cylinder for releasing the loading mechanism, trip devices controlled by the loader mechanism for releasing the line-actuating mechanism, and trip devices controlled by the line-advancing mechanism for releasing the space-discarding mechanism; means for stopping the loading mechanism after it has completed one operation until the other mechanisms have operated, means for locking the discarder mechanism prior to the stopping of the line-forwarding mechanism after it has made a complete cycle of operations, substantially as described.

93. The combination of the distributing-cylinder, a type-line channel having one part lying parallel with and opposite the channel in the distributer and having one portion extending at an angle from the vertical portion thereof, a line-elevator located at the bend of said channel and adapted to lift a line of type into the vertical portion thereof and support the same therein, and a plunger for ejecting a line of type while supported by said elevator into a channel of the distributer.

94. The combination of the distributing-cylinder, and a type-line channel having one part lying parallel with and opposite the channel in the distributer; with means for forwarding type in said channel, and space-discarding mechanism adapted to operate upon the type as it is forwarded through said channel, and means for ejecting type from the said channel into a channel of the distributer.

95. The combination of the distributing-cylinder, a type-line channel having one part lying parallel with and opposite the channel in the distributer and another part extending at right angles from the vertical portion thereof, and a line-elevator located at the bend of said channel and adapted to lift a line of type to the vertical portion thereof and support the same therein; with means for forwarding type in said channel, space-discarding mechanism adapted to operate upon the type as it is forwarded through said channel, and means for ejecting type from the vertical portion of said channel into a channel of the distributer.

96. The combination of the type-distributing cylinder, a type-channel beside the same having a vertical portion which is directly opposite and parallel with one of the channels in the distributer; a space-discarding mechanism beside said type-channel adapted to operate upon the type therein, means for forwarding a line of type to said discarder, means for forwarding a line of type from the discarder into the vertical portion of the channel, and means for loading the vertical line of type into a channel of the distributer.

97. The combination of the type-distributing cylinder, a type-channel beside the same having a horizontal portion and a vertical portion which is directly opposite and parallel with one of the channels behind the distributer, a space-discarding mechanism beside said channel adapted to operate upon the type therein, means for forwarding a line of type intermittently or step by step past said discarder, means for operating the discarder when the line dwells, means for forwarding a line of type from which the spaces have been discarded into the vertical portion of the channel, and means for shifting the vertical line of type into a channel of the distributer.

98. The combination of a distributing-cylinder, a type-channel beside the same, parallel therewith, and means for ejecting a line of type from said channel into the channel of the distributer; with a holder for dead-matter, a space-discarding mechanism intermediate the galley-holder and the line-channel, means for separating a line from the dead-matter, means for forwarding the separated line past the discarding mechanism, whereby the spaces are discarded therefrom, and means for forwarding the line from the space-discarding mechanism into said line-channel, substantially as described.

99. The combination of a distributing-cylinder, a type-channel beside the same, and parallel therewith, and means for ejecting a line of type from said channel into the channel of the distributer; with a holder for dead-matter, a space-discarding mechanism intermediate the galley-holder and the line-channel, means for separating a line from the dead-matter and discarding the leads therefrom, means for forwarding the separated line past the discarding mechanism whereby the spaces are discarded therefrom, and means for forwarding the line from the space-discarding mechanism into said line-channel, substantially as described.

100. The combination of the distributing-cylinder, a type-holding channel beside the same having a vertical extension parallel with and opposite the channel of the distributing-cylinder, a line-elevator at the bend of said channel adapted to move and support the line in the vertical portion of the channel, a dead-matter holder beside said channel, a space-discarding mechanism between said holder and said line-elevator, means for ejecting a line of type from the holder into the channel, means for forwarding the line of type in said channel past the discarding mechanism to the line-elevator, and means for ejecting a line of type in the vertical portion of said channel into a channel of the distributing-cylinder.

101. The combination of the distributing-cylinder, a type-holding channel beside the same having a vertical extension parallel with and opposite the channel of the distributing-cylinder, a line-elevator at the bend of said channel adapted to move and support the line in the vertical portion of the channel, a galley-holder beside said channel, a space-discarding mechanism between the galley-holder and said line-elevator, means for ejecting a line of type from the holder into the channel, and means for discarding leads from the line of type; with means for forwarding the line of type in said channel step by step past the ejector mechanism, by which the spaces are discarded, means for moving the line from the discarder to the line-elevator, and means for ejecting a line of type from the vertical portion of said channel into a channel of the distributing-cylinder, substantially as described.

102. The combination of the distributing-cylinder, a type-holding channel beside the same, a dead-matter or galley holder beside said channel, a space-discarding mechanism between the galley-holder and said distributing-cylinder, means for ejecting a line of type from the holder into the channel, a plunger for forwarding a line of type in said channel to the discarding mechanism, means for moving said plunger, a slide below said channel operating between the discarding mechanism and the distributing-cylinder, and adapted to take control of the line when it is released by the plunger and forward the same, and a loading-plunger adapted to eject a line of type from the channel into the distributing-cylinder.

103. The combination of the distributing-cylinder, a type-holding channel beside the same having a vertical extension parallel with and opposite the channel of the distributing-cylinder, a line-elevator at the bend of said channel, a galley-holder beside said channel, a space-discarding mechanism between the galley-holder and said line-elevator, means for ejecting a line of type from the holder into the channel, a plunger for forwarding a line of type from the galley to the discarding mechanism, means for moving said plunger, a slide below said channel operating between the discarding mechanism and a line-elevator, to take control of the line when it is released by the plunger and forward the same to the line-elevator, and a loading-plunger adapted to eject a line of type supported in the vertical portion of the channel by the line-elevator, into the distributing-cylinder.

104. The combination of the distributing-cylinder, a type-holding channel beside the same having a vertical extension parallel with and opposite the channel of the distributing-cylinder, a line-elevator at the bend of said channel adapted to move and support the line in the vertical portion of the channel, a galley-holder beside said channel, a space-discarding mechanism between the galley-holder and said line-elevator, means for ejecting a line of type from the holder into the channel, means for discarding leads from the line of type, a plunger for forwarding a line of type from the galley to the discarding mechanism, means for moving said plunger step by step, a slide below said channel operating between the discarding mechanism, and a line-elevator, and a spring-pressed plate on said slide adapted to take control of the line when it is released by the plunger and forward the same to the line-elevator, and a loading-plunger adapted to eject a line of type supported in the vertical portion of the channel by the line-elevator, into the distributing-cylinder.

105. The combination of a line-holding channel, a line-elevator, a movable slide and connections for operating said line-elevator from said slide; and said slide; with a plunger for forwarding lines of type in said channel, and the cam-actuated lever for operating said plunger, said lever being also adapted to actuate said slide at the proper time and thereby cause the line-elevator to move the line of type, substantially as described.

106. The combination of a line-holding channel bent at right angles, a line-elevator at the bend of said channel, a movable slide, the rock-shaft, links and levers for operating said line-elevator from said slide, and a spring for retracting said slide; with a plunger for forwarding lines of type in said channel, and the cam-actuated lever for operating said plunger, said lever being adapted to engage and actuate said slide at the proper time to cause the line-elevator to move a line of type, substantially as described.

107. The combination of a line-holding channel bent at right angles, a rocking line-elevator located at the bend thereof, a plunger for forwarding the type intermittently in said channel, the cam-actuated lever for operating said plunger, a slide adapted to be engaged by said lever near the end of its stroke, and the connections between said slide and said line-elevator whereby the latter is positively rocked when the plunger is moved back, and a spring for returning said line-elevator to normal position, substantially as described.

108. The combination of a line-holding channel bent at right angles, a rocking line-elevator located at the bend thereof, a plunger for forwarding the type intermittently in said channel, the cam-actuated lever for operating said plunger, a slide adapted to be engaged by said lever near the end of its stroke, and the connections between said slide and said line-elevator whereby the latter is positively rocked when the plunger is moved back; with a second plunger adapted to take control of the line when the first plunger releases the same and move said line onto the line-elevator, a cam and lever for operating said second plunger, and a spring for returning said line-elevator to normal position, substantially as described.

109. The combination of the distributing-cylinder, followers therein, a loading mechanism beside the distributing-cylinder, a pivoted trip beside the loading mechanism adapted to be tilted by the followers in the empty channel, and means for operating the loader, and mechanism for controlling the holder-operating means, adapted to be released by said trip.

110. The combination of the distributing-cylinder, followers therein, a loading mechanism beside the distributing-cylinder, a pivoted trip beside the loading mechanism adapted to be tilted by the followers in the empty channel, and the rod beside said trip adapted to be engaged and lifted thereby; with means for operating the loader, a continuously-driven shaft, a clutch for driving said loader-operating means from said shaft, and the clutch-controlling devices connected to said bar, and adapted to be released when said bar is actuated by said trip.

111. The combination of the distributing-cylinder, a line-loading mechanism beside the same, the continuously-driven shaft, the cams loosely mounted thereon for operating the loader mechanism, and the clutch for locking said cams to said shaft; with a trip-lever pivoted beside the distributer-cylinder adapted to be struck by a lug on the follower in an empty channel thereof, and connections between said trip and the clutch-controlling devices whereby the latter is released whenever the trip is operated.

112. The combination of the distributing-cylinder, a line-loading mechanism beside the same, the continuously-driven shaft, the cams loosely mounted thereon for operating the loader mechanism, and the clutch for locking said cams to said shaft; with clutch-controlling devices, a trip-lever pivoted beside the distributer-cylinder adapted to be struck by a lug on the follower in an empty channel thereof, and connections between said trip and the clutch-controlling devices whereby the latter is released whenever the trip is operated, and means for throwing the clutch mechanism out of action after each operation of the loading mechanism until the trip is again actuated.

113. The combination of the distributing-cylinder, the loading device beside the same, a trip adapted to be operated by a follower in the channel of the distributer, a vertically-movable bar adapted to lift the follower in the distributer-channel prior to the injection of a line of type therein by the loader; a cam and connections for operating the loading-plunger, another cam and connections operated thereby for operating the follower-lifter, mechanism for operating said cams controlled by said trip, whereby the cams are operated each time the trip is actuated, and means for stopping the cams when the loader has operated, until the trip is again actuated.

114. The combination of the distributing-cylinder, the loading mechanism beside the same, a trip pivoted on the loader and adapted to be operated by a follower in the channel of the distributer, a vertically-movable bar adapted to lift the follower in the channel prior to the injection of a line of type therein by the loader, a continuously-driven shaft, a sleeve thereon, a cam on said sleeve and connections for operating the loading-plunger, another cam on said sleeve, and connections operated thereby for operating the follower-lifter, a clutch for locking said sleeve to said shaft, and clutch-releasing devices controlled by said trip, whereby the sleeve is locked to the shaft each time the trip is actuated; and means for disengaging the clutch from the sleeve when the loader has operated, until the trip is again actuated.

115. The combination of the distributer-cylinder, the follower therein, a loading mechanism beside the distributing-cylinder, a continuously-driven shaft, a sleeve thereon, a ratchet on said shaft, a dog on said sleeve adapted to engage the ratchet, a pivoted shoe adapted to cause said dog to disengage the ratchet, an arm adapted to lock said shoe in position to cause the dog to disengage the ratchet, a trip-lever adapted to be rocked by a lug in an empty channel of the distributer, and connections between said trip-lever and said locking-arm.

116. The combination of the distributer-cylinder, the follower therein, a loading mechanism beside the distributing-cylinder, a continuously-driven shaft, a sleeve thereon, a ratchet on said shaft, a dog on said sleeve adapted to engage the ratchet, a spring for throwing said dog inward, a pivoted shoe adapted to cause said dog to disengage the ratchet, a rock-shaft, an arm on said shaft adapted to lock said shoe in position to cause the dog to disengage the ratchet, a trip-lever adapted to be rocked by a lug in an empty channel of the distributer and connections between said trip-lever and said rock-shaft.

117. The combination of the distributing-cylinder, the follower therein, a loading mechanism beside the distributing-cylinder, a continuously-driven shaft, a sleeve thereon, a ratchet on said shaft, a dog on said sleeve adapted to engage the ratchet, a pivoted shoe adapted to cause said dog to disengage the ratchet, an arm adapted to lock said shoe in position to cause the dog to disengage the ratchet, a trip-lever adapted to be rocked by a lug in an empty channel of the distributer and connections between said trip-lever and said arm, a cam on said sleeve, and connections between said cam and the loading-plunger, another cam on said sleeve, a lever operated by said cam, and a follower-lifting bar operated by said lever.

118. The combination of the distributer-cylinder, the follower therein, a loading mechanism beside the distributing-cylinder, a continuously-driven shaft, a sleeve thereon, a ratchet on said shaft, a dog on said sleeve adapted to engage the ratchet, a spring for throwing said dog inward, a fixed pivoted shoe adapted to cause said dog to disengage the ratchet, a rock-shaft, an arm on said shaft adapted to lock said shoe in position to cause the dog to disengage the ratchet, a trip-lever pivoted on the loader adapted to be rocked by a lug in an empty channel of the distributer, a pull-bar adapted to be actuated by said trip and connections between said pull-bar and said rock-shaft, a cam on said sleeve, and connections between said cam and the loading-plunger, another cam on said sleeve, a lever operated by said cam, and a follower-lifting bar operated by said lever.

119. The combination of the distributer-cylinder, the follower therein, a loading mechanism beside the distributing-cylinder, a continuously-driven shaft, a sleeve thereon, a ratchet on said dog, a dog on said sleeve adapted to engage the ratchet, a fixed pivoted shoe adapted to cause said dog to disengage the ratchet, an arm adapted to lock said shoe in position to cause the dog to disengage the ratchet, a trip-lever adapted to be rocked by a lug in an empty channel of the distributer and connections between said trip-lever and said arm; with a cam-actuated rod adapted to return said shoe to position to engage the dog and force it out of engagement with the ratchet, and a cam for operating said rod, for the purpose and substantially as described.

120. The combination of the distributing-cylinder, the loading mechanism, the trip adapted to be operated by lugs on the followers in the distributer-channels; with a pull-bar adapted to be operated by said trip and connections whereby said bar controls the operation of the loading mechanism, and means whereby said bar may be thrown into or out of position to be operated by the trip.

121. The combination of the distributing-cylinder, the loading mechanism, the trip adapted to be operated by lugs on the followers in the distributer-channels; a bar 342 adapted to be operated by said trip and connections whereby said bar controls the operation of the loading mechanism; with the rock-shaft 265 having an eccentric-pin engaging a slot in said bar whereby said bar may be thrown into or out of position to be operated by the trip.

122. The combination of the distributing-cylinder, the loading mechanism beside the same, a continuously-driven shaft, the means for operating the loading mechanism, actuated from said shaft, and a clutch mechanism whereby said means may be locked to the shaft; with the clutch-controlling devices comprising the trip-lever 264, bar 342, lever 341, link 338, rock-shaft 268, and arm 269 whereby the clutch is released and the loading mechanism operated when the trip is actuated, for the purpose and substantially as described.

123. The combination of the distributing-cylinder, the loading mechanism beside the same, a continuously-driven shaft, the means for operating the loading mechanism actuated from said shaft, and a clutch mechanism comprising a ratchet on the shaft, a dog on the actuating mechanism, and a shaft for disengaging the dog from the ratchet; with the clutch-controlling devices comprising the trip-lever 264, bar 342, lever 341, lever 338, rock-shaft 268, and arm 269 whereby the clutch is released and the loading mechanism operated when the trip is actuated.

124. The combination of the distributing-cylinder, the loading mechanism beside the same, a continuously-driven shaft, the actuating means for operating the loading mechanism actuated from said shaft, and a clutch mechanism comprising a ratchet on the shaft, a dog on the actuating mechanism, and a shaft for disengaging the dog from the ratchet; with the clutch-controlling devices comprising the trip-lever 264, bar 342, lever 341, lever 338, rock-shaft 268, and arm 269 whereby the clutch is released and the loading mechanism operated when the trip is actuated, and the cam-actuated push-rod 270 adapted to return the shaft in position to cause the dog to disengage the ratchet when the loader has performed one cycle of operations.

125. The combination of the continuously-driven shaft, the sleeve thereon, the ratchet on the shaft, a dog on the sleeve, the fixed shoe adapted to cause said dog to disengage said ratchet, the rock-shaft, the arm thereon for rocking said shoe, the trip-lever, and connections for rocking said shaft therefrom; with a push-rod for returning said shoe to normal position, the cam and lever for actuating said push-rod, the distributing-cylinder, the followers therein adapted to actuate said trip-lever and the loading mechanism driven from said sleeve and shaft when the clutches are in operation.

126. The combination of the distributing-cylinder, a loader opposite the same, the line-separating and space-discarding mechanisms beside the loader, a continuously-driven shaft, a sleeve thereon, cams on said sleeve for operating the loader mechanism, a cam-shaft, cams thereon and connections for operating the line-forwarding mechanism; a clutch for driving said sleeve from said continuously-driven shaft, a second clutch for driving said cam-shaft from said continuously-driven shaft; the clutch-controlling devices operated from the distributing-cylinder whereby the line forwarding and loading mechanisms are set in operation when an empty cylinder-channel comes to the loader.

127. The combination of the distributing-cylinder, a loader opposite the same, the line-separating and space-discarding mechanisms beside the loader, a continuously-driven shaft, a sleeve thereon, cams on said sleeve for operating the loader mechanism, a cam-shaft, cams thereon and connections for operating the line-forwarding mechanism therefrom, a clutch for driving said sleeve from said continuously-driven shaft, a second clutch for driving said cam-shaft from said continuously-driven shaft, a pivoted trip beside the distributing-cylinder, the clutch-controlling devices operated from said trip whereby when the trip is actuated the line forwarding and loading mechanisms are set in operation, and the clutch-resetting devices controlled from said cam-shaft whereby the loader and the line-forwarding mechanisms are stopped when they have made one cycle of operations.

128. The combination of the distributing-cylinder, a loader opposite the same, the line-separating and space-discarding mechanisms beside the loader, a continuously-driven shaft, a sleeve thereon, cams on said sleeve for operating the loader mechanism; a cam-shaft, cams thereon and connections for operating the line-forwarding mechanisms, a clutch for driving said sleeve from said continuously-driven shaft; a second clutch for driving said cam-shaft from said continuously-driven shaft, a pivoted trip beside the distributing-cylinder, the clutch-controlling devices operated from said trip whereby when the trip is actuated the line forwarding and loading mechanisms are set in operation, a second cam-shaft for operating the space-discarder mechanism, gearing between said shaft and the continuously-driven shaft, and a clutch for controlling the operation of said discarder cam-shaft, substantially as described.

129. The combination of the distributing-cylinder, a loader opposite the same, the line-separating and space-discarding mechanisms beside the loader, a continuously-driven shaft, a sleeve thereon, cams on said sleeve for operating the loader mechanism; a cam-shaft, and cams and connections for operating the line-forwarding mechanisms therefrom, a clutch for driving said sleeve from said continuously-driven shaft, a second clutch for driving said cam-shaft from said continuously-driven shaft, a third cam-shaft for operating the space-discarder mechanism, gearing between said shaft and a continuously-driven shaft, and a clutch for controlling the operation of said discarder and cam-shaft and devices whereby said clutch is controlled from the line-forwarding cam-shaft; with a pivoted trip beside the distributing-cylinder, the clutch-controlling devices operated from said trip whereby when the trip is actuated the line forwarding and loading mechanisms are set in operation, and the clutch-resetting devices controlled from said cam-shaft whereby the loader and the line-forwarding mechanisms are stopped when they have made one cycle of operation.

130. The combination of the distributing-cylinder, a mechanism for loading lines of type therein, a clutch for controlling the operation of said mechanism; devices for forwarding a line of type into the loader, and clutch mechanism for controlling the operation of said line-forwarding devices; with means for releasing the clutch for operating the loader when an empty channel of the distributer comes opposite the loader, and connections whereby the loading mechanism in operating releases the clutch of the line-forwarding mechanisms.

131. The combination of the distributing-cylinder, a mechanism for loading lines of type therein, a clutch for controlling the operation of said mechanism, mechanism for forwarding a line of type into the loader, and a clutch mechanism for controlling the operation of said line-forwarding devices; with a trip-lever adapted to be operated by projections on the followers in the distributer-channels, connections whereby said trip releases the clutch for operating the loader, and connections whereby the operation of the loading mechanism releases the clutch of the line-forwarding mechanisms.

132. The combination of the distributing-cylinder, a mechanism for loading lines of type therein, a clutch for controlling the operation of said loader; mechanism for forwarding a line of type to the loader, and a clutch mechanism for controlling the operation of said line-forwarding devices; a trip-lever adapted to be operated by projections on the followers in the distributer-channels, connections whereby said trip releases the clutch for operating the loader, and devices whereby the loading mechanism in operating releases the clutch of the line-forwarding mechanisms; with means substantially as described, operated by the line-forwarding mechanism whereby said clutches are thrown out of action and the holder and line-forwarding mechanisms stopped after making one cycle of operations, substantially as described.

133. The combination of the distributing-cylinder, mechanism beside the same for loading lines of type into the empty channels thereof, a clutch mechanism controlling the operation of the loader, mechanisms for separating a line of type from dead-matter and forwarding the same to the loader, a clutch controlling the operation of said line-forwarding mechanism, mechanism for ejecting or discarding spaces from the line of type before it is delivered to the loader, and clutch mechanism for controlling the operation of the space-discarding mechanism, and devices whereby, when an empty channel comes opposite the loader, said mechanisms are permitted to perform one cycle of operations and then their clutches disengaged until the tripping device is again actuated.

134. The combination of the distributing-cylinder, a mechanism for loading a line of type into an empty channel thereof, a clutch mechanism controlling the operation of the loader; mechanism for forwarding a line of type to the loader, a clutch controlling the operation of said line-forwarding mechanism; mechanism for discarding spaces from the line of type before it is delivered to the loader, and clutch mechanism controlling the operation of the space-discarding mechanism; with a trip-lever beside the loader adapted to be operated by lugs on the followers in the distributing-cylinder, devices operated from said trip-lever for releasing the loader clutch mechanism and permitting the same to be operated, connections operated from the loading mechanism whereby the line-forwarding clutch mechanism is released and the latter mechanism started in operation, and devices controlled by the line-forwarding mechanism whereby the discarder-clutch is released, and said discarder mechanism started in operation.

135. The combination of the distributing-cylinder, mechanism beside the same for loading a line of type into an empty channel thereof, a clutch mechanism controlling the operation of the loader, mechanism for separating a line of type from dead-matter and forwarding the same to the loader, a clutch controlling the operation of said line-forwarding mechanism, mechanism for ejecting or discarding spaces from the line of type before it is delivered to the loader and clutch mechanism for controlling the operation of the space-discarding mechanism; with a trip adapted to be operated when an empty channel in the distributing-cylinder comes opposite the loader, devices operated from said trip-lever for releasing the loader-clutch and permitting the loader to be operated; connections operated from the loading mechanism whereby the line-forwarding clutch is released and the line-forwarding mechanism started in operation; devices controlled by the line-forwarding mechanism whereby the discarder-clutch is released, and said discarder started into operation, and means whereby said clutch mechanisms are disengaged as the loader, the line advancing, and the discarding mechanisms, respectively complete one cycle of operations.

136. The combination of the distributing-cylinder, a loading mechanism beside the same for ejecting a line of type into the empty channel thereof, a clutch mechanism controlling the operation of the loader; mechanism for separating a line of type from dead-matter and forwarding the same to the loader, a clutch controlling the operation of said line-forwarding mechanism; mechanism for discarding spaces from the line of type before it is delivered to the loader and clutch mechanism for controlling the operation of the space-discarding mechanism; a trip-lever beside the loader adapted to be operated by lugs on the followers in the distributing-cylinder; devices operated from said trip-lever for releasing the loader and permitting the same to be operated, connections operated from the loading mechanism whereby the line-forwarding mechanism is released and started in operation, and devices controlled by the line-forwarding mechanism whereby the discarder-clutch is released and said mechanism started into operation; with a push-rod and lever actuated from the line-forwarding devices whereby the loader-clutch is thrown out of operation and the loader stopped; a lever and connections operated from the line-forwarding devices whereby the discarder mechanisms are thrown out of operation after they have operated a predetermined number of times; and a push-rod and connections also operated from said line-forwarding devices whereby the clutch for said mechanism is thrown out of operation when the line-forwarding cam has made one revolution.

137. The combination of the type-channel, cams and levers for forwarding a line of type therein, a continuously-driven shaft, a ratchet on said shaft, a counter-shaft for driving said cams, a disk thereon, a pawl on said disk engaging said ratchet, a shoe for disengaging the ratchet from the disk, a spring-actuated locking-pawl 291 for locking said shoe when engaged with a dog, and means for causing said pawl to release the shoe.

138. The combination of the type-channel, cams and levers for forwarding a line of type therein, a continuously-driven shaft, a ratchet on said shaft, a counter-shaft for driving said cam-shaft, a disk thereon, a pawl on said disk engaging said ratchet, a shoe 281' for disengaging the ratchet from the disk, a spring-actuated locking-pawl 291 for locking said shoe when engaged with the dog, and means for causing said pawl to release the shoe; with a push-rod for returning said shoe into position to disengage the dog, a swinging lever 585 for operating said push-rod, and a pin on the cam-shaft for actuating said lever.

139. The combination of the distributing-cylinder, the line-holding channel beside the same, and means for ejecting a line of type from the channel into the cylinder; with a movable guard-plate adapted to partially close the outer edge of the channel to prevent type dropping therethrough and means for withdrawing the plate from the channel when the line is to be ejected, substantially as described.

140. The combination of the distributing-cylinder, the loader beside the same having a line-holding channel, and means for ejecting a line from said channel into the cylinder; with a movable guard-plate adapted to partially close the outer edge of the channel to prevent type dropping therethrough and the inclined slots and pins for guiding said plate, and means for elevating said plate whereby it is caused to withdraw from the channel when a line is to be pushed into the cylinder, substantially as described.

141. The combination of the type-holding channel, the guard-plate closing the end of said channel and provided with inclined slots engaging fixed pins, a spring for depressing said plate and means for elevating the same when the channel is to be uncovered.

142. The combination of the distributing-cylinder, the loading mechanism beside the same having a type-holding channel through which the type are ejected into the channels of the distributer, a sliding bar for elevating the followers in the distributer-channels, and a guard-plate partially closing the outer end of the holder-channel and adapted to be operated by the follower-lifter, substantially as described.

143. The combination of the distributing-cylinder, the loading mechanism beside the same having a type-holding channel through which the type are ejected into the channels of the distributer, a sliding bar for elevating the followers in the distributer-channels, a guard-plate partially closing the outer end of the holder-channel, and a pivoted lever engaging said guard-plate and projecting into the path of the follower-lifter whereby the latter is caused to operate the former.

144. The combination of the distributing-cylinder, the loading mechanism beside the same having a type-holding channel through which the type are ejected into the channels of the distributer, a sliding bar for elevating the followers in the distributer-channel, a guard-plate partially closing the outer end of the holder-channel, having inclined guide-slots engaging fixed pins, a pivoted lever engaging said guard-plate and projecting into the path of the follower-lifter, and the spring for depressing said guard-plate when the bar is lowered, substantially as and for the purposes described.

145. The combination of the distributing-cylinder, the loading mechanism beside the same, a trip pivoted on the loader and adapted to be operated by a follower in the channel of the distributer, a vertically-movable bar adapted to lift the follower in the channel prior to the injection of a line of type therein by the loader, a guard-plate for the channel adapted to be moved out of the way by said bar when said bar is lifted, a continuously-driven shaft, a cam and connection for operating the loading-plunger, another cam and connections operated thereby for operating the follower-lifter, a clutch and connections for locking said cams to said shaft, clutch-releasing devices controlled by said trip, whereby the sleeve is locked to the shaft each time the trip is actuated, and means for disengaging the cams from the shaft when the loader has operated, until the trip is again actuated.

146. The combination of the distributing-cylinder, the loading mechanism beside the same, means for discarding spaces from a line of type and forwarding the same to the loader, a trip pivoted on the loader and adapted to be operated by a follower in the channel of the distributer, a vertically-movable bar adapted to lift the follower in the channel prior to the injection of a line of type therein by the loader, a guard-plate beside the channel in the loader adapted to be actuated by said bar, a continuously-driven shaft, a sleeve therein, a cam on said sleeve and connection for operating the loading-plunger, another cam on said sleeve and connections operated thereby for operating the follower-lifter; a clutch for locking said sleeve to said shaft, clutch-releasing devices controlled by said trip, whereby the sleeve is locked to the shaft each time the trip is actuated, and means for disengaging the clutch from the sleeve after the loading mechanism has operated until the trip is again actuated.

In testimony that I claim the foregoing as my own I affix my signature in presence of two witnesses.

PAUL FLEMMING COX.

In presence of—
GEORGE SMITH,
CLINTON W. COWLES.